(12) United States Patent
Endo

(10) Patent No.: US 11,374,252 B2
(45) Date of Patent: Jun. 28, 2022

(54) LITHIUM ION SECONDARY BATTERY SYSTEM, CHARGING UNIT, AND METHOD FOR CONTROLLING LITHIUM ION SECONDARY BATTERY

(71) Applicant: MURATA MANUFACTURING CO., LTD., Kyoto (JP)

(72) Inventor: Motoki Endo, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 240 days.

(21) Appl. No.: 16/722,385

(22) Filed: Dec. 20, 2019

(65) Prior Publication Data

US 2020/0350617 A1 Nov. 5, 2020

Related U.S. Application Data

(63) Continuation of application No. PCT/JP2018/023383, filed on Jun. 20, 2018.

(30) Foreign Application Priority Data

Jun. 23, 2017 (JP) .............................. JP2017-123018

(51) Int. Cl.
| | |
|---|---|
| *H01M 10/0525* | (2010.01) |
| *H01M 4/133* | (2010.01) |
| *H01M 4/505* | (2010.01) |
| *H01M 4/525* | (2010.01) |
| *H02J 7/00* | (2006.01) |
| *H01M 4/02* | (2006.01) |

(52) U.S. Cl.
CPC ....... *H01M 10/0525* (2013.01); *H01M 4/133* (2013.01); *H01M 4/505* (2013.01); *H01M 4/525* (2013.01); *H02J 7/007194* (2020.01); *H01M 2004/027* (2013.01); *H01M 2004/028* (2013.01); *H01M 2220/20* (2013.01)

(58) Field of Classification Search
CPC ............ H01M 10/0525; H01M 10/44; H01M 10/448; H01M 10/48; H01M 10/486; H01M 2004/027; H01M 2004/028; H01M 2220/20; H01M 4/133; H01M 4/505; H01M 4/525
See application file for complete search history.

(56) References Cited

U.S. PATENT DOCUMENTS

2019/0036373 A1 1/2019 Shimura

FOREIGN PATENT DOCUMENTS

| JP | 2013089363 A | 5/2013 |
|---|---|---|
| JP | 2016149917 A | 8/2016 |
| WO | 2017159031 A1 | 9/2017 |

OTHER PUBLICATIONS

International Search Report for Application No. PCT/JP2018/023383, dated Jul. 24, 2018.

*Primary Examiner* — Carlos Barcena
(74) *Attorney, Agent, or Firm* — K&L Gates LLP

(57) ABSTRACT

Provided is a lithium ion secondary battery system having excellent reliability.
Provided is a lithium ion secondary battery system including, at least a lithium ion secondary battery including a positive electrode and a negative electrode, and a lithium deposition sensor. In this lithium ion secondary battery system, the lithium deposition sensor includes an endotherm detector, and the endotherm detector detects endotherm in a constant current charging range.

22 Claims, 15 Drawing Sheets

LITHIUM ION SECONDARY BATTERY SYSTEM, CHARGING UNIT, AND METHOD FOR CONTROLLING LITHIUM ION SECONDARY BATTERY

TECHNICAL FIELD

The present technology relates to a lithium ion secondary battery system, a charging unit, and a method of controlling a lithium ion secondary battery, and more specifically relates to a lithium ion secondary battery system, a charging unit, a battery pack, a vehicle, a power storage system, an electric tool, an electronic device, and a method of controlling a lithium ion secondary battery.

BACKGROUND ART

In recent years, the demand for lithium ion secondary batteries has been rapidly expanding in technical fields such as personal computers (PCs), electronic devices such as portable communication terminals, automobiles such as electric vehicles, and new energy systems such as wind power generation.

For example, there has been proposed a state detecting device for an assembled battery, which is characterized by having a pressure detector that is disposed between cells constituting an assembled battery and detects a surface pressure distribution of the cell, and an estimation unit that estimates a state of the assembled battery according to an output of the surface pressure distribution of the pressure detector (see Patent Document 1).

Furthermore, for example, there has been proposed a battery control device for a lithium ion secondary battery including stacked electrodes. In this battery control device, the lithium ion secondary battery includes a plurality of heat flux sensors that detect a heat flux directing from the lithium ion secondary battery toward the outside of the lithium ion secondary battery, and the heat flux sensors are provided on at least one of two surfaces of the lithium ion secondary battery parallel to a stacking direction of the electrode. The battery control device further includes an estimation unit that calculates a heat generation distribution of the lithium ion secondary battery based on detection values of the plurality of heat flux sensors and estimates a lithium ion concentration distribution in the electrode based on the calculation result (see Patent Document 2).

PRIOR ART DOCUMENTS

Patent Documents

Patent Document 1: Japanese Patent Application Laid-Open No. 2013-20826
Patent Document 2: Japanese Patent Application Laid-Open No. 2016-149917

SUMMARY OF THE INVENTION

Problem to be Solved by the Invention

However, the techniques proposed in Patent Documents 1 and 2 may not be able to further improve reliability. Therefore, at present, there have been demands for a lithium ion secondary battery system and a charging unit which have further improved reliability, and a method of controlling a lithium ion secondary battery capable of achieving high reliability.

Thus, the present technology has been made in view of such circumstances, and its main object is to provide a lithium ion secondary battery system, a charging unit, a battery pack, a vehicle, a power storage system, an electric tool, and an electronic device, which have excellent reliability, and a method of controlling a lithium ion secondary battery capable of achieving high reliability.

Means for Solving the Problem

As a result of extensive research to solve the above-mentioned object, the present inventor has found that when non-uniform charging is proceeded while increasing a charging rate, endotherm occurs with lithium (Li) deposition, and this endotherm is detected, so that it is possible to determine whether lithium (Li) is deposited. Based on this unique knowledge, the present inventor succeeded in developing a lithium ion secondary battery system and a charging unit, which have excellent reliability, and a method of controlling a lithium ion secondary battery capable of achieving high reliability, and completed the present technology.

That is, the present technology provides a lithium ion secondary battery system, including at least a lithium ion secondary battery including a positive electrode and a negative electrode, and a lithium deposition sensor, the lithium deposition sensor includes an endotherm detector, and the endotherm detector detects endotherm in a constant current charging range.

The lithium ion secondary battery system according to the present technology may further include a sensor measurement section and a lithium deposition determination calculation section.

In the lithium ion secondary battery system according to the present technology, the endotherm detector may continuously detect endotherm up to an ultimate voltage in the constant current charging range, and the lithium deposition sensor may detect lithium deposition.

In the lithium ion secondary battery system according to the present technology, the negative electrode may contain a negative electrode active material, and the endotherm detector may detect endotherm in a constant current charging range where there is no endothermic reaction due to a structural change of the negative electrode active material.

The negative electrode active material may be a carbon-based material, and the endotherm detector may detect endotherm in a constant current charging range where a charge capacity of the negative electrode exceeds 180 mAh/g.

In the lithium ion secondary battery system according to the present technology, the positive electrode may contain a positive electrode active material, and the endotherm detector may detect endotherm in a constant current charging range where there is no endothermic reaction due to a structural change of the positive electrode active material.

The positive electrode active material may be a lithium cobaltate-based material (LCO-based material) or a nickel-based material (NCA-based material), and the endotherm detector may detect endotherm in a constant current charging range where a charge capacity of the positive electrode exceeds 60 mAh/g.

The positive electrode active material may be a nickel-cobalt-manganese ternary material (NCM-based material), and the endotherm detector may detect endotherm in a constant current charging range where a charge capacity of the positive electrode exceeds 100 mAh/g.

The positive electrode active material may be a lithium manganate-based material (LMO-based material), and the endotherm detector may detect endotherm in a constant current charging range where a charge capacity of the positive electrode exceeds 70 mAh/g.

In the lithium ion secondary battery system according to the present technology, the endotherm detector may detect endotherm in a voltage range of 80% or more of a use voltage range during charging.

In the lithium ion secondary battery system according to the present technology, the endotherm detector may include a thermometer or a heat flow sensor.

The present technology also provides a charging unit including a lithium ion secondary battery system according to the present technology, a current measuring section, a voltage measuring section, and a charge control section.

The present technology provides a method of controlling a lithium ion secondary battery, the method including controlling a charging current in a constant current charging range based on an endotherm detection result of an endotherm detector included in a lithium deposition sensor.

In the method according to the present technology, the endotherm detection result of the endotherm detector may indicate whether or not endotherm continues up to an ultimate voltage in the constant current charging range.

The present technology also provides a method of controlling a lithium ion secondary battery, the method including controlling an ultimate voltage in a constant current charging range based on an endotherm detection result of an endotherm detector included in a lithium deposition sensor.

In the method according to the present technology, the endotherm detection result of the endotherm detector may indicate whether or not endotherm continues up to the ultimate voltage in the constant current charging range.

The present technology also provides a battery pack including a lithium ion secondary battery system according to the present technology, provides a battery pack including the lithium ion secondary battery system according to the present technology, a control section that controls a usage state of the lithium ion secondary battery system, and a switch section that switches the usage state of the lithium ion secondary battery system in response to an instruction from the control section, provides a vehicle including the lithium ion secondary battery system according to the present technology, a driving force conversion device that receives a supply of electric power from the lithium ion secondary battery system and converts the electric power into a driving force of the vehicle, and a drive section that drives according to the driving force, and a vehicle control device, provides a power storage system including an electrical storage device having the lithium ion secondary battery system according to the present technology, a power consumption device to which electric power is supplied from the lithium ion secondary battery system, a control device that controls the electric power supply from the lithium ion secondary battery system to the power consumption device, and a power generation device that charges the lithium ion secondary battery system, provides an electric tool including the lithium ion secondary battery system according to the present technology and a movable section to which electric power is supplied from the lithium ion secondary battery system, and provides an electronic device including the lithium ion secondary battery system according to the present technology and receiving a supply of electric power from the lithium ion secondary battery system.

The present technology also provides a battery pack including a charging unit according to the present technology, provides a battery pack including the charging unit according to the present technology, a control section that controls a usage state of the charging unit, and a switch section that switches the usage state of the charging unit in response to an instruction from the control section, provides a vehicle including the charging unit according to the present technology, a driving force conversion device that receives a supply of electric power from the charging unit and converts the electric power into a driving force of the vehicle, and a drive section that drives according to the driving force, and a vehicle control device, provides an electrical storage system including a power storage device having the charging unit according to the present technology, a power consumption device to which electric power is supplied from the charging unit, a control device that controls the electric power supply from the charging unit to the power consumption device, and a power generation device that charges the charging unit, provides an electric tool including the charging unit according to the present technology and a movable section to which electric power is supplied from the charging unit, and provides an electronic device including the charging unit according to the present technology and receiving a supply of electric power from the charging unit.

Advantageous Effect of the Invention

According to the present technology, the reliability of the lithium ion secondary battery can be improved. The effects described herein are non-limiting, and may be any one of effects described in the present disclosure or may be different therefrom.

MODE FOR CARRYING OUT THE INVENTION

Figure 1:
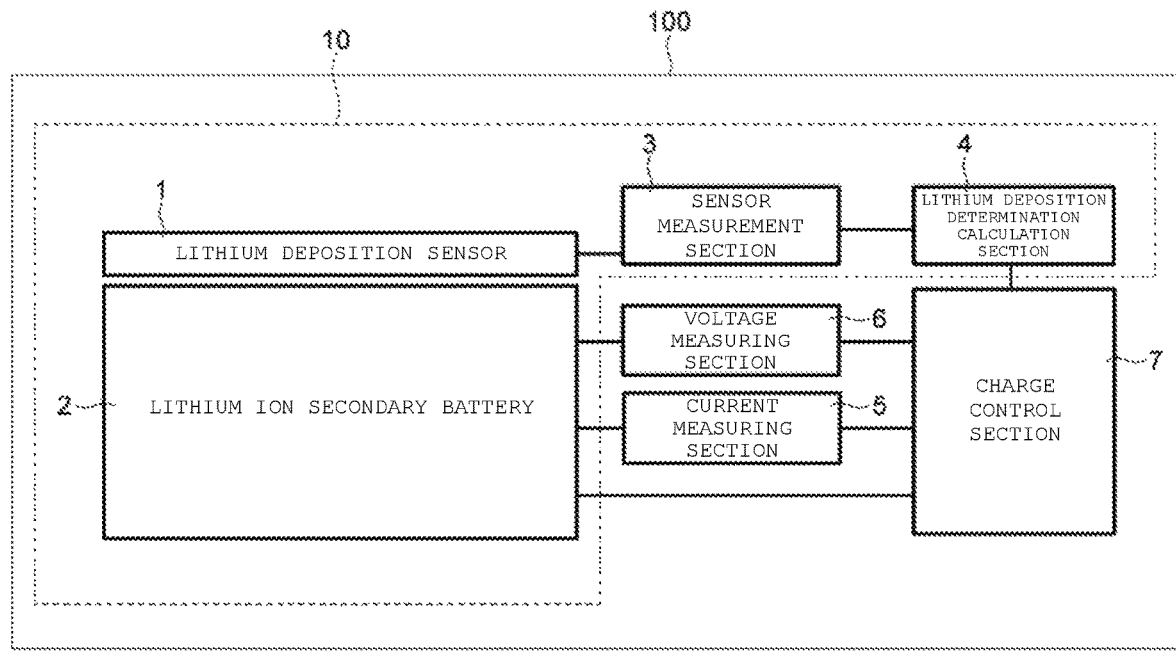
FIG. 1 is a block diagram showing a configuration example of a charging unit of a second embodiment according to the present technology.

Hereinafter, preferred embodiments for carrying out the present technology will be described. The embodiments described below illustrate typical embodiments of the present technology and do not limit the scope of the present technology. In the drawings, the same or similar components or members are denoted by the same reference symbols, and repetitive description thereof is omitted.

The description will be given in the following order.

1. Outline of present technology
2. First embodiment (Example of lithium ion secondary battery system)
3. Second embodiment (Example of charging unit)
4. Third embodiment (Example 1 of method of controlling lithium ion secondary battery)
5. Fourth embodiment (Example 2 of method of controlling lithium ion secondary battery)
6. Applications of lithium ion secondary battery system and charging unit
6-1. Outline of applications of lithium ion secondary battery system and charging unit
6-2. Fifth embodiment (Example of battery pack)
6-3. Sixth embodiment (Example of vehicle)
6-4. Seventh embodiment (Example of power storage system)
6-5. Eighth embodiment (Example of electric tool)
6-6. Ninth embodiment (Example of electronic device)

1. Outline of Present Technology

First, an outline of the present technology will be described.

One of performances required for lithium ion secondary batteries is rapid chargeability. During rapid charge, battery reaction is unlikely to proceed uniformly, and local overcharge conditions such as lithium (Li) deposition are likely to occur. When the lithium ion secondary battery is overcharged, the battery becomes thermally unstable, increasing the risk of ignition.

For example, as a means for detecting lithium (Li) deposition, there is a technique of a method of using a surface pressure sensor to classify cases into a case where the surface pressure of the battery increases globally and a case where the surface pressure of the battery increases locally and thus to determine the former case as lithium (Li) deposition and the latter case as high rate deterioration. However, with this technique, the determination is difficult when local lithium (Li) deposition is involved depending on the battery structure.

For example, as a means for detecting a non-uniform charge state in a battery, there is a technique of a method of estimating distribution of lithium ion concentration by detecting distribution of Joule heat generated by energization using a heat flow sensor. However, with this technique, if an endothermic reaction occurs in an overcharged state, the estimation cannot be performed.

The present technology is based on the above situation, and the present technology can provide a lithium ion secondary battery system capable of improving and maintaining reliability of a lithium ion secondary battery, a charging unit including the lithium ion secondary battery system, and a method of controlling the lithium ion secondary battery system.

That is, according to the present technology, it is possible to detect unsafety due to lithium (Li) deposition, and when lithium (Li) deposition is detected, a charging current for the next charge is reduced, or a set voltage is lowered, so that the lithium ion secondary battery can be used under a condition that lithium (Li) is not deposited.

The lithium ion secondary battery used in the present technology is not particularly limited in the shape of the battery, the type of an exterior body, etc., and is, for example, a laminate-film-type, cylindrical type, rectangular type, coin type, button type, disk type, or flat-plate type lithium ion secondary battery.

The lithium ion secondary battery system and the charging unit according to the present technology can be suitably applied to battery packs, vehicles, power storage systems, electric tools, electronic devices, and the like.

2. First Embodiment (Example of Lithium Ion Secondary Battery System)

A lithium ion secondary battery system of a first embodiment (an example of the lithium ion secondary battery system) according to the present technology includes, at least a lithium ion secondary battery including a positive electrode and a negative electrode, and a lithium deposition sensor. The lithium deposition sensor includes an endotherm detector, and the endotherm detector detects endotherm in a constant current charging range.

The lithium ion secondary battery system of the first embodiment according to the present technology can detect unsafety due to lithium (Li) deposition and can change a condition such that lithium (Li) is not deposited by reducing a charging current for the next charge or lowering a set voltage when detecting lithium (Li) deposition. Lithium (Li) deposition is prevented by this change, and a thermally unstable state due to an overcharged state is avoided, and the risk of ignition can be suppressed.

Therefore, according to the lithium ion secondary battery system of the first embodiment according to the present technology, safety is improved, and an excellent reliability effect is exhibited.

In the lithium ion secondary battery system of the first embodiment according to the present technology, the endotherm detector included in the lithium deposition sensor detects endotherm in the constant current charging range and determines whether lithium (Li) is deposited. Charging (constant current charging) is performed at a constant current up to a maximum usable voltage, and charging (constant voltage charging) is then further performed while decreasing the current so as to maintain the maximum voltage. In the lithium ion secondary battery system of the first embodiment according to the present technology, Joule heat generation is also reduced due to a current drop in a constant voltage charging range, so that it is difficult to detect endotherm and determine whether lithium (Li) is deposited. Therefore, endotherm is detected in the constant current charging range to determine whether lithium (Li) is deposited.

The lithium deposition sensor may be installed at an arbitrary location in the lithium ion secondary battery system, and for example, the lithium deposition sensor may be installed to be fixed (for example, bonded) to an outer surface of the lithium ion secondary battery, or may be installed in the lithium ion secondary battery, or may be installed outside the lithium ion secondary battery.

The lithium ion secondary battery system of the first embodiment according to the present technology may further include a sensor measurement section and a lithium deposition determination calculation section. The sensor measurement section and the lithium deposition determination calculation section may not be provided in the lithium ion secondary battery system, but may be provided in an external device or the like (such as a battery charger).

In the lithium ion secondary battery system, the lithium deposition sensor including the endotherm detector outputs heat generation and endotherm of the lithium ion secondary battery as an electrical signal, for example, a voltage value. The sensor measurement section measures an electrical signal, for example, a voltage value, and outputs the numerical value to the lithium deposition determination calculation section. The lithium (Li) deposition determination calculation section analyzes a change in the received numerical value and compares it with a change in charging current and an accumulated charge capacity value acquired by a charge control section included in a charging unit of a second embodiment described later to determine whether or not the value is in a lithium (Li) deposition determination-enabled range. When the value is in the lithium (Li) deposition determination-enabled range, and when it is determined that endotherm due to lithium (Li) deposition continues, the determination is transmitted to a charge/discharge control section.

The charge control section controls and lowers the charging current for the next charge or controls and lowers an ultimate voltage (set voltage) and thereby suppresses lithium (Li) deposition.

In the lithium ion secondary battery system of the first embodiment according to the present technology, preferably, the endotherm detector continuously detects endotherm up to an ultimate voltage in the constant current charging range, and the lithium deposition sensor detects lithium deposition. This is because this preferred embodiment makes it possible to more accurately determine whether lithium (Li) is deposited. Lithium (Li) is deposited mainly on a surface of a negative electrode active material layer and at an interface between the negative electrode active material layer and a current collector (current collector foil). However, the location where lithium (Li) is deposited depends on a battery structure of the lithium ion secondary battery, and lithium (Li) may be deposited at a location other than the surface of the negative electrode active material layer and the interface between the negative electrode active material layer and the current collector (current collector foil).

In the lithium ion secondary battery system of the first embodiment according to the present technology, preferably, the negative electrode contains a negative electrode active material, and the endotherm detector detects endotherm in a constant current charging range where there is no endothermic reaction due to a structural change of the negative electrode active material. This is because the detection of endotherm may be affected by the structural change of the negative electrode active material and an entropy change due to ordering of ion arrangement. According to this preferred embodiment, the endotherm detector can reliably detect endotherm and more accurately determine whether lithium (Li) is deposited. Therefore, the lithium ion secondary battery system of the first embodiment according to the present technology may not be suitable in a region where the endothermic reaction due to the structural change of the negative electrode active material continues to the ultimate voltage of charge.

Hereinafter, the negative electrode included in the lithium ion secondary battery system of the first embodiment according to the present technology will be described in detail.

For example, the negative electrode has a structure in which a negative electrode active material layer is provided on each surface of a negative electrode current collector. The negative electrode active material layer may be provided only on one surface of the negative electrode current collector. The negative electrode current collector is made of, for example, a metal foil such as a copper foil.

The negative electrode active material layer is configured to contain one or two or more kinds of a negative electrode material capable of occluding and releasing lithium as the negative electrode active material and contain a conductive agent such as graphite and a binder such as polyvinylidene fluoride as necessary.

In the lithium ion secondary battery included in the lithium ion secondary battery system of the first embodiment according to the present technology, as long as lithium metal is not deposited on the negative electrode on the way of charge, the electrochemical equivalent of the negative electrode material capable of occluding and releasing lithium may be larger or smaller than the electrochemical equivalent of the positive electrode material.

The lithium ion secondary battery is designed so as to have an open circuit voltage (namely, a battery voltage) at the full charge falling within the range of 4.2 V or more and 4.6 V or less, for example.

Examples of the negative electrode materials capable of occluding and releasing lithium include carbon-based materials such as hardly graphitizable carbon, easily graphitizable carbon, graphite, pyrolytic carbons, cokes, glassy carbons, organic polymer compound burnt bodies, carbon fiber and activated carbon. Among these, examples of the cokes include pitch coke, needle coke, petroleum coke and the like. The organic polymer compound burnt body means a carbonized material obtained by baking a polymer material such as a phenol resin or a furan resin at an appropriate temperature. Some of such carbonized materials are classified as hardly graphitizable carbon or easily graphitizable carbon. Examples of the polymer material include polyacetylene and polypyrrole. These carbon-based materials are preferred because they exhibit very little change in their crystal structures during charging and discharging, and provide a high charge/discharge capacity and excellent cycle characteristics. Graphite is especially preferred, as it has a large electrochemical equivalent and provides a high energy density. Further, hardly graphitizable carbon is preferable because it provides excellent characteristics. Furthermore, it is preferable to use a carbon material having a low charge/discharge potential, specifically, a carbon material having a charge/discharge potential that is close to that of lithium metal, because the higher energy density can be easily realized for the battery.

As the negative electrode materials capable of occluding and releasing lithium, a material capable of occluding and releasing lithium and containing, as a constituent element, at least one kind among metal elements and metalloid elements is also exemplified. This is because a high energy density can be obtained by using such a material. In particular, it is more preferred to use such a negative electrode active material together with a carbon material because this enables a high energy density as well as excellent cycle characteristics to be obtained.

This negative electrode material may be a single material of a metal element or a metalloid element or an alloy or compound thereof. Also, the negative electrode material may be one having a phase of one or two or more kinds of these materials in at least a part thereof. In the present invention, the alloy includes, in addition to materials made of two or more kinds of metal elements, materials containing one or more kinds of metal elements and one or more kinds of metalloid elements. Further, the alloy may contain a non-metal element. The compositional structure of the alloy includes a solid solution, a eutectic (eutectic mixture), an intermetallic compound, and a material in which two or more kinds of these coexist.

Examples the metal element or metalloid element constituting the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

Above all, the negative electrode material preferably contains, as a constituent element, a metal element or a metalloid element of 4B group in the short periodical table. The negative electrode material particularly preferably contains at least one of silicon (Si) and tin (Sn) as a constituent element. This is because silicon (Si) and tin (Sn) each have a high capability of occluding and releasing lithium (Li), so that a high energy density can be obtained.

Examples of the tin (Sn) alloy include tin alloys containing, as the second constituent element other than tin (Sn), at least one kind of the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the silicon (Si) alloy include silicon alloys containing, as the second constituent element other than silicon (Si), at least one kind of the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the tin (Sn) compound and the silicon (Si) compound include compounds containing oxygen (O) or carbon (C), and these compounds may further contain the above-described second constituent elements in addition to tin (Sn) or silicon (Si).

As the negative electrode materials capable of occluding and releasing lithium, other metal compounds or polymer materials are further exemplified. Examples of other metal compounds include oxides such as $MnO_2$, $V_2O_5$ and $V_6O_{13}$; sulfides such as NiS and MoS; and lithium nitrides such as $LiN_3$. Examples of the polymer material include polyacetylene, polyaniline, and polypyrrole.

As the negative electrode materials capable of occluding and releasing lithium, LTO-based materials (lithium-titanium composite oxides) are exemplified.

In the lithium ion secondary battery system of the first embodiment according to the present technology, when the negative electrode active material is the carbon-based material described above, the endotherm detector preferably detects endotherm in a constant current charging range where a charge capacity of the negative electrode exceeds 180 mAh/g.

Among carbon-based materials, for example, graphite undergoes a structural change at the same time as such a composition change where $Li_XC_6$ (0<X<1) with insertion of lithium (Li). Since this structural change is accompanied by a change in entropy, clear endothermic heat generation is expressed. In the lithium ion secondary battery system of the first embodiment according to the present technology, in order to detect lithium (Li) deposition by detecting endotherm, it is necessary to perform the detection in a charge depth range beyond endotherm of graphite that occurs at a deepest charge depth, and the charge depth corresponds to X=0.5 (about 180 mAh/g).

Further, in the lithium ion secondary battery system of the first embodiment according to the present technology, when the negative electrode active material is the Si-based material (negative electrode material containing Si), the Sn-based material (negative electrode material containing Sn) and the LTO-based material (lithium-titanium composite oxide) described above, there is no structural change that involves endotherm, so that the endotherm detector does not specify a range of the constant current charging range where endotherm is detected.

In the lithium ion secondary battery system of the first embodiment according to the present technology, preferably, the positive electrode contains a positive electrode active material, and the endotherm detector detects endotherm in a constant current charging range where there is no endothermic reaction due to a structural change of the positive electrode active material. This is because the detection of endotherm may be affected by the structural change of the positive electrode active material and an entropy change due to ordering of ion arrangement. According to this preferred embodiment, the endotherm detector can reliably detect endotherm and more accurately determine whether lithium (Li) is deposited. Therefore, the lithium ion secondary battery system of the first embodiment according to the present technology may not be suitable in a region where the endothermic reaction due to the structural change of the positive electrode active material continues to the ultimate voltage of charge.

Hereinafter, the positive electrode included in the lithium ion secondary battery system of the first embodiment according to the present technology will be described in detail.

For example, the positive electrode has a structure in which a positive electrode active material layer is provided on each surface of a positive electrode current collector. The positive electrode active material layer may be provided only on one surface of the positive electrode current collector. The positive electrode current collector is made of, for example, a metal foil such as an aluminum foil. The positive electrode active material layer contains, for example, one or two or more kinds of a positive electrode material capable of occluding and releasing lithium as the positive electrode active material and is configured to contain a binder, which is the same as the binder of the negative electrode active material layer, as needed.

As for the positive electrode material capable of occluding and releasing lithium, for example, a lithium oxide, a lithium phosphorus oxide, a lithium sulfide, or a lithium-containing compound, such as an interlayer compound containing lithium, is suitable, and two or more types thereof may be used in combination. In order to increase the energy density, a lithium-containing compound containing lithium, transition metal element, and oxygen (O) is preferable, and most of all, a compound containing at least one type selected from the group consisting of cobalt (Co), nickel (Ni), manganese (Mn), and iron (Fe) as the transition metal element is more preferable. Examples of such lithium-containing compounds include lithium composite oxides, which are represented by Formula (1), Formula (2), or Formula (3) and which have a layered rock salt type structure, lithium composite oxides, which are represented by Formula (4) and which have a spinel structure, and lithium composite phosphates, which are represented by Formula (5) and which have an olivine type structure. Specific examples include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_jMn_{(1-g-h)}Ni_gM1_hO_{(2-j)}F_k \quad (1)$$

(where M1 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values within the range of 0.8≤f≤1.2, 0<g<0.5, 0≤h≤0.5, g+h<1, −0.1≤j≤0.2, and 0≤k≤0.1. The composition of lithium varies with the state of charge and discharge, and the value of f represents a value in a fully discharged state.)

$$Li_mNi_{(1-n)}m^2{}_nO_{(2-p)}F_q \quad (2)$$

(where $m^2$ represents at least one type selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values within the range of 0.8≤m≤1.2, 0.005≤n≤0.5, −0.1≤p≤0.2, and 0≤q≤0.1. The composition of lithium varies with the state of charge and discharge, and the value of m represents a value in a fully discharged state.)

$$Li_rCo_{(1-s)}M3_sO_{(2-t)}F_u \quad (3)$$

(where M3 represents at least one type selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u are values within the range of 0.8≤r≤1.2, 0≤s<0.5, −0.1≤t≤0.2, and 0≤u≤0.1. The composition of lithium varies with the state of charge and discharge, and the value of r represents a value in a fully discharged state.)

$$Li_vMn_{2-w}M4_wO_xF_y \quad (4)$$

(where M4 represents at least one type selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values within the range of 0.9≤v≤1.1, 0≤w≤0.6, 3.7≤x≤4.1, and 0≤y≤0.1. The composition of lithium varies with the state of charge and discharge, and the value of v represents a value in a fully discharged state.)

$$Li_zM5PO_4 \quad (5)$$

(where M5 represents at least one type selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value within the range of 0.9≤z≤1.1.

The composition of lithium varies with the state of charge and discharge, and the value of z represents a value in a fully discharged state.)

Besides them, examples of positive electrode materials capable of occluding and releasing lithium include inorganic compounds not containing lithium, such as $MnO_2$, $V_2O_5$, $V_6O_{13}$, NiS, and MoS.

In the lithium ion secondary battery system of the first embodiment according to the present technology, when the positive electrode active material included in the positive electrode is the lithium cobaltate-based material (LCO-based material) or the nickel-based material (lithium nickel-based material) (NCA-based material) described above, if lithium (Li) is extracted, a broad endotherm is shown with a structural change of the LCO-based material or NCA-based material, so that it is preferable that the endotherm detector detect the endotherm in the constant current charging range where the charge capacity of the positive electrode exceeds 60 mAh/g.

Further, in the lithium ion secondary battery system of the first embodiment according to the present technology, when the positive electrode active material included in the positive electrode is the nickel-cobalt-manganese ternary material (NCM-based material) described above, if lithium (Li) is extracted, a broad endotherm is shown with a structural change of the NCM-based material, so that it is preferable that the endotherm detector detect the endotherm in the constant current charging range where the charge capacity of the positive electrode exceeds 100 mAh/g.

Further, in the lithium ion secondary battery system of the first embodiment according to the present technology, when the positive electrode active material included in the positive electrode is the lithium manganate-based material (LMO-based material) described above, if lithium (Li) is extracted, a broad endotherm is shown with a structural change of the LMO-based material, so that it is preferable that the endotherm detector detect the endotherm in the constant current charging range where the charge capacity of the positive electrode exceeds 70 mAh/g.

According to a combination of the negative electrode active material and the positive electrode active material, when a range of the charge capacity where endotherm is detected is specified in the constant current charging range, the charge depth for detecting endotherm is limited to the deeper one. For example, when the negative electrode active material is graphite and the positive electrode active material is an NCA-based material, endotherm is detected at 180 mAh/g or more of graphite where a detection capacity is deeper, and whether lithium (Li) is deposited is determined. When the range of the charge capacity where endotherm is detected is not specified in the constant current charging range, such as when the negative electrode active material is a Si-based material, whether lithium (Li) is deposited is determined by detecting endotherm by specification of the range of the charge capacity of the positive electrode active material where endotherm is detected in the constant current charging range.

In the lithium ion secondary battery system of the first embodiment according to the present technology, the endotherm detector preferably detects endotherm in a voltage range of 80% or more of a use voltage range during charging. This is because, in the voltage range of 80% or more of the use voltage range, when non-uniform charging is proceeded while increasing the charging rate, endotherm associated with lithium (Li) deposition is more likely to occur, making it easier to determine whether lithium (Li) is deposited. The voltage range of 80% or more of the use voltage range means, for example, 3.96 V or more which is 80% or more of 1.2 V in a 3 V-4.2 V lithium ion secondary battery with a use voltage width of 1.2 V.

The endotherm detector is not particularly limited, and examples thereof include a thermometer and a heat flow sensor. Examples of the thermometer include a thermocouple and a resistance thermometer, and examples of the heat flow sensor include a thermopile heat flow meter.

The lithium ion secondary battery included in the lithium ion secondary battery system of the first embodiment according to the present technology may include a separator. The separator isolates the positive electrode and the negative electrode from each other to prevent short circuit of a current due to contact between both the electrodes, and allows a lithium ion to pass therethrough. The separator is made of, for example, a porous film of a polyolefin-based material such as polypropylene or polyethylene, or a porous film of an inorganic material such as ceramic nonwoven fabric, and may have a structure in which two or more kinds of the porous films are stacked.

The separator is impregnated with an electrolytic solution that is a liquid electrolyte. The electrolytic solution contains, for example, a solvent and a lithium salt as an electrolyte salt. The solvent dissolves and dissociates the electrolyte salt. Examples of the solvent include cyclic carbonic acid ester such as ethylene carbonate (EC), propylene carbonate (PC), or butylene carbonate (BC); chain carbonate such as dimethyl carbonate (DMC), ethylmethyl carbonate (EMC), diethyl carbonate (DEC), dipropyl carbonate (DPC), propyl methyl carbonate (PMC), or propyl ethyl carbonate (PEC); cyclic ether such as tetrahydrofuran (THF), 2-methyltetrahydrofuran (2-MeTHF), 1,3-dioxolane (DOL), or 4-methyl-1,3-dioxolane (4-MeDOL); chain ether such as 1,2-dimethoxyethane (DME) or 1,2-diethoxyethane (DEE); cyclic ester such as γ-butyrolactone (GBL) or γ-valerolactone (GVL); and chain ester such as methyl acetate, ethyl acetate, propyl acetate, methyl formate, ethyl formate, propyl formate, methyl butyrate, methyl propionate, ethyl propionate, or propyl propionate. Alternatively, examples of the organic solvent include tetrahydropyran, 1,3-dioxane, 1,4-dioxane, N,N-dimethylformamide (DMF), N,N-dimethylacetamide (DMA), N-methylpyrrolidinone (NMP), N-methyloxazolidinone (NMO), N,N'-dimethylimidazolidinone (DMI), dimethyl sulfoxide (DMSO), trimethyl phosphate (TMP), nitromethane (NM), nitroethane (NE), sulfolane (SL), methyl sulfolane, acetonitrile (AN), anisole, propionitrile, glutaronitrile (GLN), adiponitrile (ADN), methoxyacetonitrile (MAN), 3-methoxypropionitrile (MPN), and diethyl ether. Alternatively, an ionic liquid may be used. Any conventionally known ionic liquid may be used, which may be selected as needed.

Examples of the lithium salt include $LiPF_6$, $LiClO_4$, $LiBF_4$, $LiAsF_6$, $LiSbF_6$, $LiTaF_6$, $LiNbF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $1/2Li_2B_{12}F_{12}$, $Li_2SiF_6$, LiCl, LiBr, and LiI, but are not limited to these lithium salts.

The lithium ion secondary battery included in the lithium ion secondary battery system of the first embodiment according to the present technology may be constituted of a stacked electrode body in which a positive electrode and a negative electrode are stacked with a separator interposed therebetween, or a wound electrode body in which a positive electrode and a negative electrode are stacked with a separator interposed therebetween and then further wound, and an exterior body that houses the stacked electrode body and the wound electrode body.

Furthermore, the lithium ion secondary battery included in the lithium ion secondary battery system of the first embodiment according to the present technology may include an electrolyte layer. In this case, the lithium ion secondary battery may be constituted of a stacked electrode body in which a positive electrode and a negative electrode are stacked with a separator and the electrolyte layer interposed therebetween, or a wound electrode body in which a positive electrode and a negative electrode are stacked with a separator and the electrolyte layer interposed therebetween and then further wound, and an exterior body that houses the stacked electrode body and the wound electrode body.

The electrolyte layer is one in which an electrolytic solution is held by a polymer compound, and may contain other materials such as various additives as needed. The electrolyte layer is, for example, a so-called gel electrolyte. The gel electrolyte is preferable because high ion conductivity (for example, 1 mS/cm or higher at room temperature) is achieved, and, at the same time, liquid leakage of the electrolytic solution is prevented.

Examples of the polymer compound include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, polycarbonate, and a copolymer of vinylidene fluoride and hexafluoropyrene. One thereof may be used singly, or a plurality thereof may be used by mixture. In particular, vinylidene polyfluoride or the copolymer of vinylidene fluoride and hexafluoropyrene is preferable, since they are electrochemically stable.

The exterior body is not particularly limited as long as it can house the stacked electrode body or the wound electrode body described above. Examples of the exterior body include an exterior member including a laminate material constituting a laminated film type lithium ion secondary battery, and a battery can constituting a cylindrical type or rectangular type lithium ion secondary battery.

The laminate material is a laminated film in which a fusion-bonding layer, a metal layer, and a surface protective layer are stacked in this order, for example. The fusion-bonding layer is formed of, for example, polyolefin resin such as polyethylene and polypropylene. The metal layer is formed of, for example, aluminum. The surface protective layer is formed of, for example, nylon or polyethylene terephthalate. An exterior member 40 may be a laminated film having another laminated structure, or may be a single polymer film or a single metal film.

The battery can may be formed of a material such as iron (Fe), nickel (Ni), aluminum (Al), titanium (Ti), alloys of these metals, and stainless steel (SUS). The battery can may be plated with nickel or the like in order to prevent electrochemical corrosion associated with the charge/discharge of the lithium ion secondary battery.

The lithium ion secondary battery included in the lithium ion secondary battery system of the first embodiment according to the present technology can be manufactured as follows, for example.

First, a positive electrode is produced. Initially, a positive electrode active material and, if necessary, a binder and a conductive agent are mixed to form a positive electrode mixture, and then, for example, the positive electrode mixture is dispersed in an organic solvent or the like to form a pasty or slurry-like positive electrode mixture slurry.

Subsequently, the positive electrode mixture slurry is uniformly applied onto both surfaces of the positive electrode current collector and then dried to form a positive electrode active material layer. Finally, while heating the positive electrode active material layer as necessary, the positive electrode active material layer is compression-molded with use of a roll pressing machine or the like. In this case, compression molding may be repeated multiple times.

Next, a negative electrode is produced by the same procedure as that for the positive electrode described above. First, a negative electrode active material and, if necessary, a binder and a conductive agent are mixed to form a negative electrode mixture, and then, for example, the negative electrode mixture is dispersed in an organic solvent or the like to form a pasty or slurry-like negative electrode mixture slurry.

Thereafter, the negative electrode mixture slurry is uniformly applied onto both surfaces of the negative electrode current collector and then dried to form a negative electrode active material layer, and then the negative electrode active material layer is compression-molded.

A positive electrode lead is attached to the positive electrode produced as described above while a negative electrode lead is attached to the negative electrode produced as described above. Subsequently, the positive electrode and the negative electrode are stacked on each side with a separator interposed therebetween to adhere a fixing member, and thus to produce a stacked electrode body (battery element).

Next, remaining outer circumferential edges excluding an outer circumferential edge on one side are adhered by a thermal fusion bonding or the like to enclose the stacked electrode body into the exterior member including the laminate material. Subsequently, after an electrolytic solution is injected into the exterior member including the bag-shaped laminate material, an opening of the exterior member is sealed by a thermal fusion bonding or the like, whereby a lithium ion secondary battery can be obtained. A precursor solution containing a solvent, an electrolyte salt, a polymer compound, and a mixed solvent is applied to each of the positive electrode and the negative electrode, and the mixed solvent is volatilized, thereby forming the electrolyte layer, whereby the lithium ion secondary battery may be obtained.

Furthermore, the lithium ion secondary battery included in the lithium ion secondary battery system of the first embodiment according to the present technology may be manufactured as follows, for example.

As described above, the positive electrode and the negative electrode are produced, and then, while the positive electrode lead is attached to the positive electrode current collector by welding or the like, and the negative electrode lead is attached to the negative electrode current collector by welding or the like. Then, the positive electrode and the negative electrode are wound with a separator 23 interposed therebetween.

Then, a tip end portion of the positive electrode lead is welded to a safety valve mechanism, a tip end portion of the negative electrode lead is welded to the battery can, and the wound positive electrode and negative electrode are sandwiched between a pair of insulating plates and housed inside the battery can.

Then, after the positive electrode and the negative electrode are housed inside the battery can, the electrolytic solution is injected into the battery can to impregnate the separator. Then, a battery lid, the safety valve mechanism, and a heat sensitive resistance element are fixed to an opening end portion of the battery can by caulking via a sealing gasket. Accordingly, a lithium ion secondary battery is obtained.

3. Second Embodiment (Example of Charging Unit)

A charging unit of a second embodiment (Example of charging unit) according to the present technology is a charging unit including a lithium ion secondary battery system of the first embodiment according to the present technology, a current measuring section, a voltage measuring section, and a charge control section. The lithium ion secondary battery system of the first embodiment according to the present technology included in the charging unit of the second embodiment according to the present technology may include at least a lithium ion secondary battery and a lithium deposition sensor or may include at least a lithium ion secondary battery, a lithium deposition sensor, a sensor measurement section, and a lithium deposition determination calculation section.

The charging unit of the second embodiment according to the present technology can detect unsafety due to lithium (Li) deposition and, when detecting lithium (Li) deposition, can change a condition such that lithium (Li) is not deposited by reducing a charging current for the next charge or lowering a set voltage by the charge control section. Lithium (Li) deposition is prevented by this change, and a thermally unstable state due to an overcharged state is avoided, and the risk of ignition can be suppressed.

Therefore, according to the charging unit of the second embodiment according to the present technology, safety is improved, and an excellent reliability effect is exhibited.

Hereinafter, the charging unit of the second embodiment (Example of charging unit) according to the present technology will be described in more detail with reference to FIG. 1. FIG. 1 is a block diagram showing a configuration example of the charging unit of the second embodiment according to the present technology.

As shown in FIG. 1, a charging unit 100 is constituted of a lithium ion secondary battery system 10, a current measuring section 5, a voltage measuring section 6, and a charge control section 7. The lithium ion secondary battery system 10 is constituted of a lithium deposition sensor 1, a lithium ion secondary battery 2, a sensor measurement section 3, and a lithium (Li) deposition determination calculation section 4.

In a charging unit 100, the lithium deposition sensor 1 including an endotherm detector outputs heat generation and endotherm of the lithium ion secondary battery 2 as an electrical signal, for example, a voltage value. The sensor measurement section 3 measures an electrical signal, for example, a voltage value, and outputs the numerical value to the lithium deposition determination calculation section 4. The lithium (Li) deposition determination calculation section 4 analyzes a change in the received numerical value and compares it with a change in charging current and an accumulated charge capacity value acquired by the charge control section 7 to determine whether or not the value is in a lithium (Li) deposition determination-enabled range. When the value is in the lithium (Li) deposition determination-enabled range, and when it is determined that endotherm due to lithium (Li) deposition continues, the determination is transmitted to the charge/discharge control section 7. The charge control section 7 controls and lowers the charging current for the next charge or controls and lowers an ultimate voltage (set voltage) and thereby suppresses lithium (Li) deposition. The current measuring section 5 measures the charging current with use of a current detection resistor (not shown), and outputs a measurement result to the charge control section 7. The voltage measuring section 6 measures the voltage of the lithium ion secondary battery 2, converts the measured voltage from analog to digital, and outputs the converted voltage to the charge control section 7.

4. Third Embodiment (Example 1 of Method of Controlling Lithium Ion Secondary Battery)

A method of controlling the lithium ion secondary battery of a third embodiment (Example 1 of Method of Controlling Lithium Ion Secondary Battery) according to the present technology is based on an endotherm detection result of an endotherm detector included in a lithium deposition sensor and is a method of controlling a charging current in a constant current charging range. The lithium deposition sensor used in the method of controlling a lithium ion secondary battery of the third embodiment according to the present technology may be the lithium deposition sensor of the first embodiment according to the present technology.

When the method of controlling a lithium ion secondary battery of the third embodiment according to the present technology is used, unsafety due to lithium (Li) deposition can be detected, and when lithium (Li) deposition is detected, the charging current in the constant current charging range for the next time can be controlled and lowered. In the method of lowering the charging current, the charging current may be lowered over the entire constant current charging range, or the value of the charging current in an initial constant current charging range may be set to the same value as the previous (initial) value, and the charging current may be lowered from the middle of the constant current charging range. By controlling and lowering the charging current, it is possible to change a condition such that lithium (Li) is not deposited. Lithium (Li) deposition is prevented by this change, and a thermally unstable state due to an overcharged state is avoided, and the risk of ignition can be suppressed. Therefore, according to the method of controlling a lithium ion secondary battery of the third embodiment according to the present technology, safety is improved, and a high reliability effect is exhibited.

In the method of controlling a lithium ion secondary battery of the third embodiment according to the present technology, the endotherm detection result of the endotherm detector preferably indicates whether or not endotherm continues up to an ultimate voltage in the constant current charging range. According to this preferred embodiment, when lithium (Li) deposition is detected, the charging current in the constant current charging range for the next time can be controlled and lowered more reliably.

5. Fourth Embodiment (Example 2 of Method of Controlling Lithium Ion Secondary Battery)

A method of controlling the lithium ion secondary battery of a fourth embodiment (Example 2 of method of controlling lithium ion secondary battery) according to the present technology is based on an endotherm detection result of an endotherm detector included in a lithium deposition sensor and is a method of controlling an ultimate voltage in a constant current charging range. The lithium deposition sensor used in the method of controlling a lithium ion secondary battery of the fourth embodiment according to the present technology may be the lithium deposition sensor of the first embodiment according to the present technology.

When the method of controlling a lithium ion secondary battery of the fourth embodiment according to the present technology is used, unsafety due to lithium (Li) deposition can be detected, and when lithium (Li) deposition is detected, the ultimate voltage in the constant current charging range for the next time can be controlled and lowered. By controlling and lowering the ultimate voltage, it is possible to change a condition such that lithium (Li) is not deposited. Lithium (Li) deposition is prevented by this change, and a thermally unstable state due to an overcharged state is avoided, and the risk of ignition can be suppressed. Therefore, according to the method of controlling a lithium ion secondary battery of the fourth embodiment according to the present technology, safety is improved, and a high reliability effect is exhibited.

In the method of controlling a lithium ion secondary battery according to the present technology, the endotherm detection result of the endotherm detector preferably indicates whether or not endotherm continues up to the ultimate voltage in the constant current charging range. According to this preferred embodiment, when lithium (Li) deposition is detected, the ultimate voltage in the constant current charging range for the next time can be controlled and lowered more reliably.

6. Applications of Lithium Ion Secondary Battery System and Charging Unit

Applications of the lithium ion secondary battery system and the charging unit will be described in detail below.

6-1. Outline of Applications of Lithium Ion Secondary Battery System and Charging Unit Applications of the lithium ion secondary battery system and the charging unit are not particularly limited as long as the lithium ion secondary battery system and the charging unit are applied to a machine, a device, an appliance, an apparatus, a system (collective entity of a plurality of devices and the like), or the like that is capable of using the lithium ion secondary battery system or the charging unit as a driving electric power source, an electric power storage source for electric power accumulation, or the like. The lithium ion secondary battery system or the charging unit used as an electric power source may be a main power source (an electric power source to be used preferentially) or an auxiliary power source (an electric power source which is used in place of the main power source or by being switched from the main power source). When the lithium ion secondary battery system or the charging unit is used as an auxiliary power source, the type of the main power source is not limited to a battery and a battery module.

Examples of applications of the lithium ion secondary battery system and the charging unit are as follows. Examples thereof include a notebook personal computer, a tablet computer, a mobile phone (for example, a smart phone), a personal digital assistant (PDA), an imaging device (for example, a digital still camera or a digital video camera), an audio device (for example, a portable audio player), and electronic devices (including portable electronic devices) such as a game device, a cordless handset phone machine, an electronic book, an electronic dictionary, a radio, a headphone, a navigation system, a memory card, a pacemaker, a hearing aid, a lighting device, a toy, a medical device, and a robot. Further examples thereof include a mobile daily electric appliance such as an electric shaver; a storage device such as a backup electric power source and a memory card; an electric power tool such as an electric drill and an electric saw; a battery pack used as a detachable electric power source of, for example, a notebook personal computer; a medical electronic apparatus such as a pacemaker and a hearing aid; a vehicle used for, for example, an electric automobile (including a hybrid automobile); and a power storage system such as a home battery system for accumulation of electric power for, for example, emergency. Of course, the application of the lithium ion secondary battery system and the charging unit may be any other application than the foregoing.

The lithium ion secondary battery system is particularly effective when applied to battery packs, vehicles, power storage systems, electric tools, and electronic devices. The charging unit is also particularly effective when applied to vehicles, power storage systems, and electronic devices. This is because, since excellent reliability is required, the use of the lithium ion secondary battery system or the charging unit according to the present technology can effectively improve the reliability of the battery. The battery pack is an electric power source using the lithium ion secondary battery system or the charging unit, and is a so-called assembled battery or the like. The vehicle is a vehicle that works (travels) with use of the lithium ion secondary battery system or the charging unit as a driving electric power source, and as described above, the vehicle may be an automobile (such as a hybrid automobile) including a drive source other than the lithium ion secondary battery system or the charging unit. Examples of the power storage system includes a residential power storage system, and the power storage system is a system that uses the lithium ion secondary battery system or the charging unit as an electric power storage source. In a power storage system, electric power is accumulated in the lithium ion secondary battery system or the charging unit as an electric power storage source, and therefore, power consuming equipment, for example, home electric products can be used using the electric power. The electric tool is a tool in which a movable section (such as a drill) is allowed to move with use of the lithium ion secondary battery system or the charging unit as a driving electric power source. The electronic device is a device executing various functions with use of the lithium ion secondary battery system or the charging unit as a driving electric power source (electric power supply source).

Here, some application examples of the lithium ion secondary battery system or the charging unit will be specifically described. The configurations of the application examples explained below are merely examples, and may be changed as appropriate.

6-2. Fifth Embodiment (Example of Battery Pack)

A battery pack of a fifth embodiment according to the present technology includes the lithium ion secondary battery system of the first embodiment according to the present technology. The battery pack of the fifth embodiment according to the present technology includes the charging unit of the second embodiment according to the present technology. For example, the battery pack of the fifth embodiment according to the present technology includes the lithium ion secondary battery system of the first embodiment according to the present technology, a control section that controls a usage state of the lithium ion secondary battery system, and a switch section that switches the usage state of the lithium ion secondary battery system in response to an instruction from the control section. Further, for example, the battery pack of the fifth embodiment according to the present technology includes the charging unit of the second embodiment according to the present technology, a control section that controls a usage state of the charging unit, and a switch section that switches the usage state of the charging unit in response to an instruction from the control section. Since the battery pack of the fifth embodiment according to the present technology includes the lithium ion secondary battery system of the first embodiment or the charging unit of the second embodiment according to the present technology having excellent reliability, this will improve reliability of the battery pack, such as safety.

Hereinafter, the battery pack of the fifth embodiment according to the present technology will be described with reference to the drawings.

Figure 7:
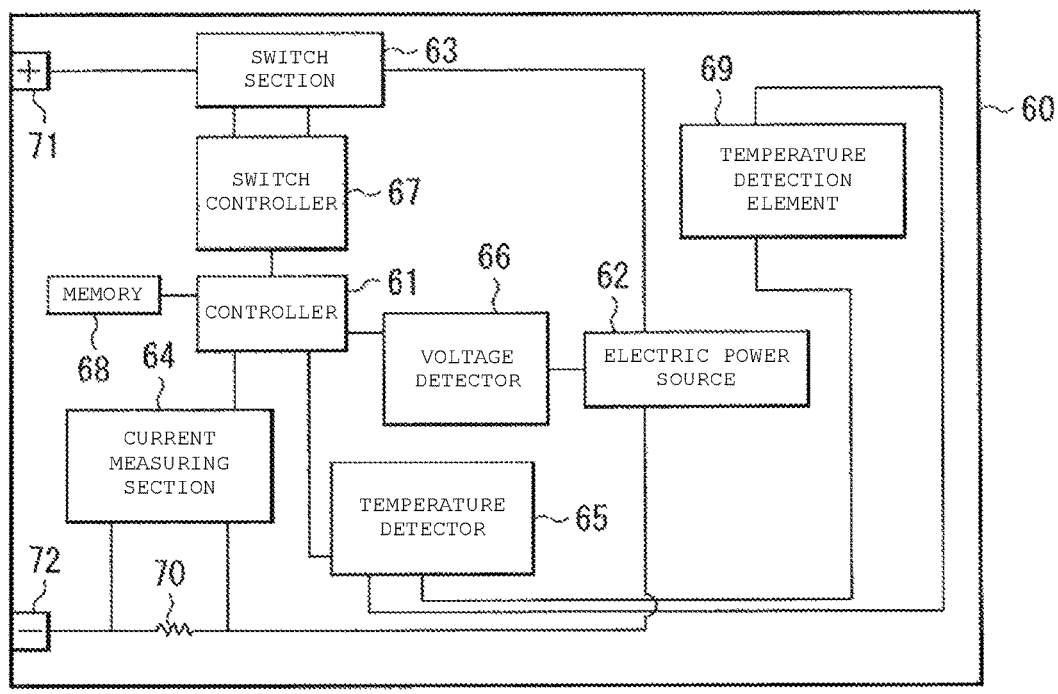
FIG. 7 is a block diagram showing a configuration of an application example (battery pack) of a lithium ion secondary battery system and a charging unit according to the present technology.

FIG. 7 shows a block configuration of the battery pack. For example, the battery pack includes a controller 61, an electric power source 62, a switch section 63, a current measuring section 64, a temperature detector 65, a voltage detector 66, a switch controller 67, a memory 68, a temperature detection element 69, a current detection resistance 70, a positive electrode terminal 71, and a negative electrode terminal 72 in a housing 60 formed of a plastic material or the like.

The controller 61 controls the operation of the entire battery pack (including the usage state of the electric power source 62) and includes, for example, a central processing unit (CPU). The electric power source 62 includes one or two or more batteries (not shown). The electric power source 62 is, for example, an assembled battery including two or more batteries, and the batteries may be connected in series, in parallel, or in series-parallel combination. As an example, the electric power source 62 includes six batteries in which two sets of series-connected three batteries are connected in parallel to each other.

The switch section 63 switches the usage state of the electric power source 62 (whether or not the electric power source 62 is allowed to be coupled to an external device) in response to an instruction of the controller 61. The switch section 63 includes, for example, a charge control switch, a discharge control switch, a charging diode, and a discharging diode (all of them are not shown). The charge control switch and the discharge control switch are each, for example, a semiconductor switch such as a metal-oxide-semiconductor field-effect transistor (MOSFET).

The current measuring section 64 measures a current with use of the current detection resistance 70, and outputs a measurement result thereof to the controller 61. The temperature detector 65 measures temperature with use of the temperature detection element 69, and outputs a measurement result thereof to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the battery in the electric power source 62, performs analog-to-digital conversion on the measured voltages, and supplies the resultant to the controller 61.

The switch controller 67 controls an operation of the switch section 63 in accordance with signals input from the current measuring section 64 and the voltage detector 66.

For example, in the case where a battery voltage reaches an overcharge detection voltage, the switch controller 67 causes the switch section 63 (charge control switch) to be disconnected and performs control so that a charging current does not flow into a current path of the electric power source 62. This makes it possible to perform only discharge through the discharging diode in the electric power source 62. For example, when a large current flows during charging, the switch controller 67 blocks the charging current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharge current.

In the battery, the overcharge detection voltage is, for example, 4.2 V±0.05 V, and the overdischarge detection voltage is, for example, 2.4 V±0.1 V.

The memory 68 is, for example, an EEPROM as a non-volatile memory.

The memory 68 stores, for example, numerical values calculated by the controller 61 and information of the battery measured in a manufacturing process (such as an internal resistance in an initial state). In the case where the memory 68 holds full charge capacity of the battery, the controller 61 is allowed to comprehend information such as remaining capacity.

The temperature detection element 69 measures a temperature of the electric power source 62, outputs a measurement result thereof to the controller 61, and is, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

6-3. Sixth Embodiment (Example of Vehicle)

A vehicle of a sixth embodiment according to the present technology includes the lithium ion secondary battery system of the first embodiment according to the present technology, a driving force conversion device that receives a supply of electric power from the lithium ion secondary battery system and converts the electric power into a driving force, a drive section that drives according to the driving force, and a vehicle control device. Furthermore, the vehicle of the sixth embodiment according to the present technology includes the charging unit of the second embodiment according to the present technology, a driving force conversion device that receives a supply of electric power from the charging unit and converts the electric power into a driving force, a drive section that drives according to the driving force, and a vehicle control device.

Since the vehicle of the sixth embodiment according to the present technology includes the lithium ion secondary battery system of the first embodiment or the charging unit of the second embodiment according to the present technology having excellent reliability, this will improve reliability of the vehicle, such as safety.

Hereinafter, the vehicle of the sixth embodiment according to the present technology will be described with reference to FIG. 8.

Figure 8:
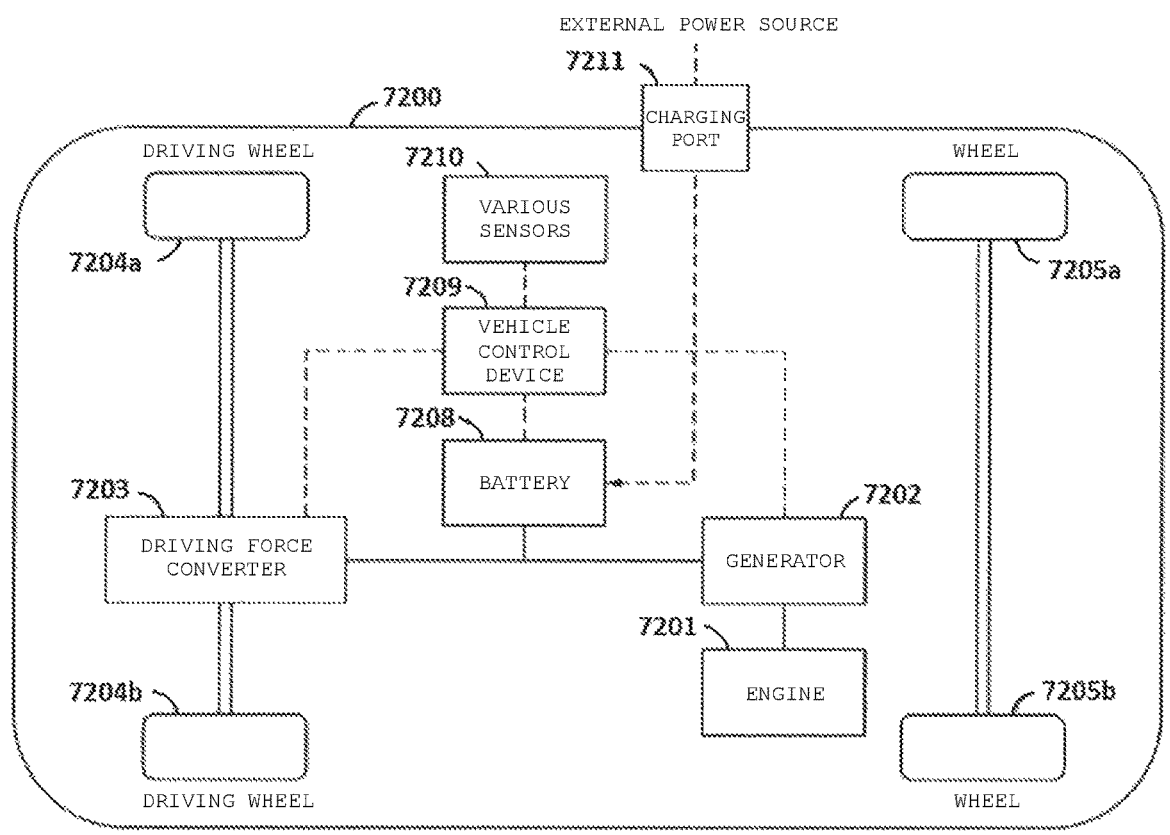
FIG. 8 is a block diagram showing a configuration of an application example (vehicle) of the lithium ion secondary battery system and the charging unit according to the present technology.

FIG. 8 schematically shows an example of a configuration of a hybrid vehicle employing a series hybrid system to which the present technology is applied. The series hybrid system is a car travelling with an electric power driving force converter using electric power generated by a generator driven by an engine or electric power obtained by temporarily storing the generated electric power in a battery.

An engine 7201, a generator 7202, an electric power driving force converter 7203, a driving wheel 7204a, a driving wheel 7204b, a wheel 7205a, a wheel 7205b, a battery 7208, a vehicle control device 7209, various sensors 7210, and a charging port 7211 are mounted in a hybrid vehicle 7200. A power storage device (not shown) is applied to the battery 7208.

The hybrid vehicle 7200 travels using the electric power driving force converter 7203 as a power source. An example of the electric power driving force converter 7203 is a motor. The electric power driving force converter 7203 acts by electric power of the battery 7208, and a rotating force of the electric power driving force converter 7203 is transmitted to the driving wheels 7204a and 7204b. The electric power driving force converter 7203 can be applied to both an AC motor and a DC motor by using DC-AC conversion or reverse conversion (AC-DC conversion) at necessary portions. The various sensors 7210 control an engine speed through the vehicle control device 7209, or control an opening degree (throttle opening degree) of a throttle valve (not shown). The various sensors 7210 include a velocity sensor, an acceleration sensor, an engine speed sensor, and the like.

A rotating force of the engine 7201 is transmitted to the generator 7202, and electric power generated by the generator 7202 can be stored in the battery 7208 by the rotating force.

When the hybrid vehicle is decelerated by a brake mechanism (not shown), a resistance force during the deceleration is added to the electric power driving force converter 7203 as a rotating force, and regenerative electric power generated by the electric power driving force converter 7203 due to this rotating force is stored in the battery 7208.

By being connected to an external power source of the hybrid vehicle, the battery 7208 receives electric power supply from the external power source by using the charging port 211 as an input port, and can store the received electric power.

Although not shown, an information processing device for performing information processing relating to vehicle control based on information on the lithium ion secondary battery system or the charging unit may be included. An example of such an information processing device includes an information processing device for displaying a battery remaining amount based on information about the remaining amount of the lithium ion secondary battery system and the charging unit.

The above description has been made by exemplifying a series hybrid car travelling with a motor using electric power generated by a generator driven by an engine or electric power obtained by temporarily storing the generated electric power in a battery. However, the present technology can also be applied effectively to a parallel hybrid car which uses the output of an engine and a motor as the driving force source and switches three modes as appropriate: driving with the engine only; driving with the motor only; and driving with the engine and the motor. In addition, the present technology can also be applied effectively to a so-called electric vehicle travelling by driving only with a driving motor without use of an engine.

6-4. Seventh Embodiment (Example of Power Storage System)

A power storage system of a seventh embodiment according to the present technology includes a power storage device including the lithium ion secondary battery system of the first embodiment according to the present technology, a power consumption device to which electric power is supplied from the lithium ion secondary battery system, a control device that controls the electric power supply from the lithium ion secondary battery system to the power consumption device, and a power generation device that charges the lithium ion secondary battery system. Furthermore, the power storage system of the seventh embodiment according to the present technology includes the power storage device including the charging unit of the second embodiment according to the present technology, a power consumption device to which electric power is supplied from the charging unit, a control device that controls the electric power supply from the charging unit to the power consumption device, and a power generation device that charges the charging unit. Since the power storage system of the seventh embodiment according to the present technology includes the lithium ion secondary battery system of the first embodiment or the charging unit of the second embodiment according to the present technology having excellent reliability, this will improve reliability of the power storage system, such as safety.

Figure 9:
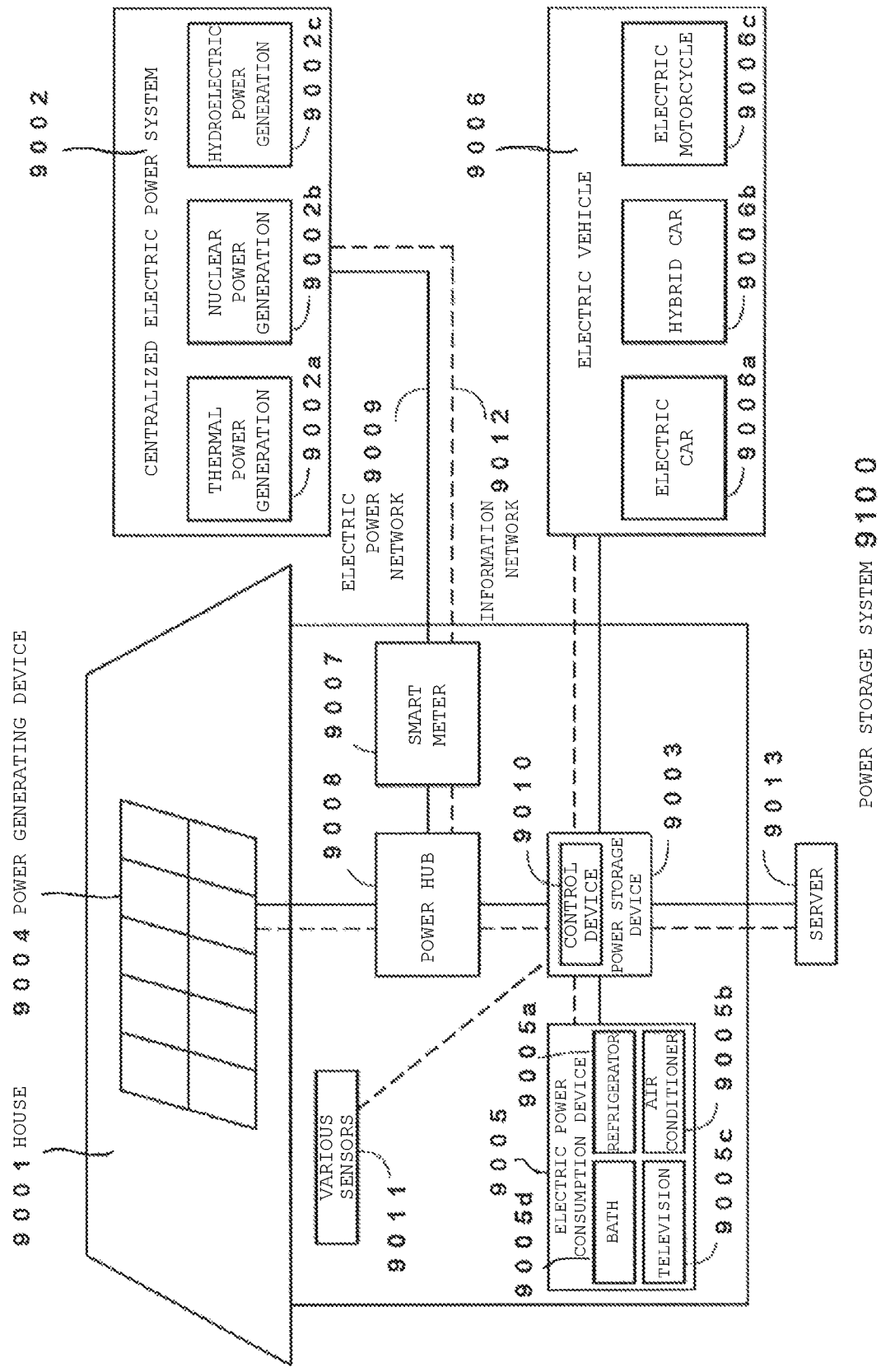
FIG. 9 is a block diagram showing a configuration of an application example (power storage system) of the lithium ion secondary battery system and the charging unit according to the present technology.

Hereinafter, a residential power storage system as an example of the power storage system of the seventh embodiment according to the present technology will be described with reference to FIG. 9.

For example, in a power storage system 9100 for a house 9001, electric power is supplied from a centralized electric power system 9002 such as thermal power generation 9002*a*, nuclear power generation 9002*b*, or hydroelectric power generation 9002*c* to a power storage device 9003 via an electric power network 9009, an information network 9012, a smart meter 9007, a power hub 9008, or the like. At the same time, electric power is supplied from an independent power source such as a home power generating device 9004 to the power storage device 9003. The electric power supplied to the power storage device 9003 is stored. Electric power used in the house 9001 is supplied using the power storage device 9003. Not only the house 9001 but also a building can use a similar power storage system.

The house 9001 is provided with the power generating device 9004, an electric power consumption device 9005, the power storage device 9003, a control device 9010 for controlling devices, the smart meter 9007, and a sensor 9011 for acquiring various information. The devices are connected to each other via the electric power network 9009 and the information network 9012. As the power generating device 9004, a solar cell, a fuel cell, or the like is used, and generated electric power is supplied to the electric power consumption device 9005 and/or the power storage device 9003. The electric power consumption device 9005 is a refrigerator 9005*a*, an air conditioner 9005*b*, a television receiver 9005*c*, a bath 9005*d*, or the like. Furthermore, the electric power consumption device 9005 further includes an electric vehicle 9006. The electric vehicle 9006 is an electric car 9006*a*, a hybrid car 9006*b*, an electric motorcycle 9006*c*, or the like.

The lithium ion secondary battery system of the first embodiment or the charging unit (battery unit) of the second embodiment according to the present technology described above is applied to the power storage device 9003. The power storage device 9003 includes a lithium ion secondary battery system, a charging unit, or a capacitor. For example, the power storage device 9003 is constituted by a lithium ion secondary battery. The lithium ion secondary battery may be a stationary type or may be used in the electric vehicle 9006. The smart meter 9007 has a function of measuring a use amount of commercial electric power, and transmitting the measured use amount to an electric power company. The electric power network 9009 may be any one of DC power supply, AC power supply, and non-contact power supply, or a combination of two or more of these.

Examples of the various sensors 9011 include a human detection sensor, an illuminance sensor, an object detection sensor, a consumed electric power sensor, a vibration sensor, a contact sensor, a temperature sensor, and an infrared sensor. Information acquired by the various sensors 9011 is transmitted to the control device 9010. With the information from the sensors 9011, weather conditions, human conditions, and the like are grasped, and the electric power consumption device 9005 is automatically controlled so as to minimize energy consumption. Furthermore, the control device 9010 can transmit information on the house 9001 to an external electric power company or the like via internet.

The power hub 9008 performs processing such as branching of an electric power line or DC-AC conversion. A communication method of the information network 9012 connected to the control device 9010 includes a method of using a communication interface such as universal asynchronous receiver-transmitter (UART): asynchronous serial communication transmitter/receiver circuit) and a method of using a sensor network by a wireless communication standard, such as Bluetooth (registered trademark), ZigBee, or Wi-Fi. The Bluetooth (registered trademark) method is applied to multimedia communication and can perform one-to-many communication. ZigBee uses a physical layer of institute of electrical and electronics engineers (IEEE) 802.15.4. IEEE 802.15.4 is a name of a short-distance wireless network standard called personal area network (PAN) or wireless (W) PAN.

The control device 9010 is connected to an external server 9013. This server 9013 may be managed by any one of the house 9001, an electric power company, and a service provider. For example, information transmitted or received by the server 9013 is consumption electric power information, life pattern information, electric power charge, weather information, natural disaster information, or information about electric power transaction. Although a home electric power consumption device (for example, a television receiver) may transmit or receive the above information, an outside-home device (for example, a mobile phone) may transmit or receive the information. A device having a display function, such as a television receiver, a mobile phone, or personal digital assistants (PDA) may display the information.

The control device 9010 for controlling units is formed by a CPU, a random access memory (RAM), a read only memory (ROM), and the like, and is housed in the power storage device 9003 in this example. The control device 9010 is connected to the power storage device 9003, the home power generating device 9004, the electric power consumption device 9005, the various sensors 9011, and the server 9013 via the information network 9012, and for example, has a function of adjusting a use amount of commercial electric power and a power generation amount. In addition, the control device 9010 may have a function of performing electric power transaction in an electric power market.

As described above, the power storage device 9003 can store not only electric power from the centralized electric power system 9002 such as the thermal power 9002a, the nuclear power 9002b, or the hydroelectric power 9002c but also electric power generated by the home power generating device 9004 (photovoltaic power generation or wind power generation).

Accordingly, even when the electric power generated by the home power generating device 9004 fluctuates, controls to keep the amount of electric power to be sent to an outside constant or to discharge by a necessary amount of electric power can be performed. For example, the following method of use is possible. That is, electric power obtained by photovoltaic power generation is stored in the power storage device 9003, midnight electric power the charge of which is low at night is stored in the power storage device 9003, and electric power stored in the power storage device 9003 is used by discharging in daytime in which electric power charge is high.

In this example, the control device 9010 housed in the power storage device 9003 has been exemplified, but the control device 9010 may be housed in the smart meter 9007, or may be formed alone. Furthermore, the power storage system 9100 may be used for a plurality of homes in a multiple dwelling house or a plurality of detached houses.

6-5. Eighth Embodiment (Example of Electric Tool)

The electric tool of the eighth embodiment according to the present technology includes the lithium ion secondary battery system of the first embodiment according to the present technology and a movable section to which electric power is supplied from the lithium ion secondary battery system. Furthermore, the electric tool of the eighth embodiment according to the present technology includes the charging unit of the second embodiment according to the present technology and a movable section to which electric power is supplied from the charging unit. Since the electric tool of the eighth embodiment according to the present technology includes the lithium ion secondary battery system of the first embodiment or the charging unit of the second embodiment according to the present technology having excellent reliability, this will improve reliability of the electric tool, such as safety.

Hereinafter, the electric tool of the eighth embodiment according to the present technology will be described with reference to FIG. 10.

Figure 10:
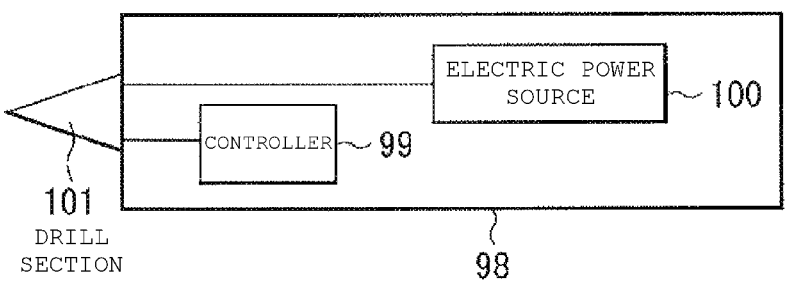
FIG. 10 is a block diagram showing a configuration of an application example (electric tool) of the lithium ion secondary battery system and the charging unit according to the present technology.

FIG. 10 shows a block configuration of an electric tool. The electric tool is, for example, an electric drill and includes a controller 99 and an electric power source 100 inside a tool body 98 formed of a plastic material or the like. For example, a drill section 101 as a movable section is attached to the tool body 98 in an operable (rotatable) manner.

The controller 99 controls the operation of the entire electric tool (including the usage state of the electric power source 100) and includes, for example, a CPU. The electric power source 100 includes one or two or more batteries (not shown). The controller 99 allows electric power to be supplied from the electric power source 100 to the drill section 101 in accordance with an operation by an operation switch (not shown).

6-6. Ninth Embodiment (Example of Electronic Device)

An electronic device of a ninth embodiment according to the present technology includes the lithium ion secondary battery system of the first embodiment according to the present technology and receives a supply of electric power from the lithium ion secondary battery system. Furthermore, the electronic device of the ninth embodiment according to the present technology includes the charging unit of the second embodiment according to the present technology and receives a supply of electric power from the charging unit. As described above, the electronic device of the ninth embodiment according to the present technology is a device executing various functions with use of the lithium ion secondary battery system or the charging unit as a driving electric power source (electric power supply source). Since the electronic device of the ninth embodiment according to the present technology includes the lithium ion secondary battery system of the first embodiment or the charging unit of the second embodiment according to the present technology having excellent reliability, this will improve reliability of the electronic device, such as safety.

Figure 11:
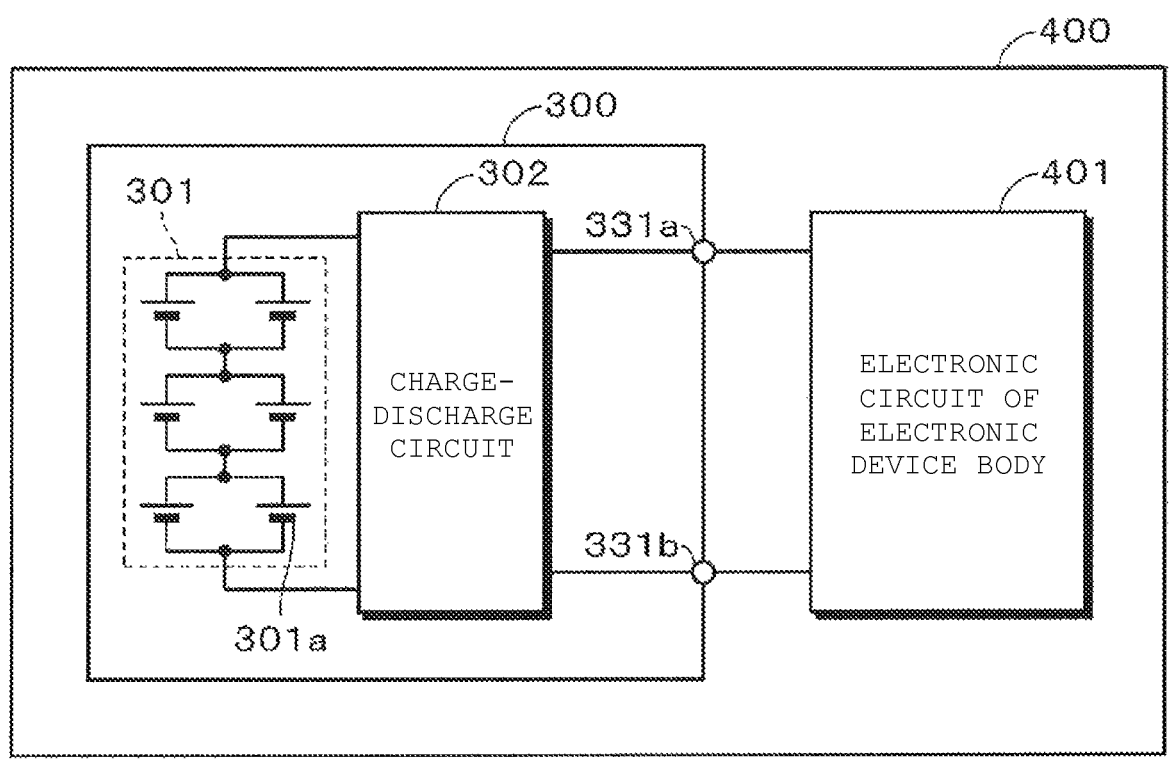
FIG. 11 is a block diagram showing a configuration of an application example (electronic device) of the lithium ion secondary battery system and the charging unit according to the present technology.

Hereinafter, the electronic device of the ninth embodiment according to the present technology will be described with reference to FIG. 11.

An example of a configuration of an electronic device 400 according to a ninth embodiment of the present technology will be described. The electronic device 400 includes an electronic circuit 401 of an electronic device body and the battery pack 300. The battery pack 300 is electrically connected to the electronic circuit 401 via a positive electrode terminal 331a and a negative electrode terminal 331b. For example, the electronic device 400 has a configuration in which the battery pack 300 is detachable by a user. The configuration of the electronic device 400 is not limited to this example, and the battery pack 300 may be incorporated in the electronic device 400 such that a user cannot remove the battery pack 300 from the electronic device 400.

During charging of the battery pack 300, the positive electrode terminal 331a and the negative electrode terminal 331b of the battery pack 300 are connected to a positive electrode terminal and a negative electrode terminal of a charger (not shown), respectively. On the other hand, during discharging of the battery pack 300 (during use of the electronic device 400), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smart phone), a personal digital assistant (PDA), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, a lighting device, a toy, a medical device, and a robot, but are not limited to these devices. As specific examples, a head-mounted display and a band-type electronic device will be described. The head-mounted display includes an image display device, a wearing device with which the image display device is worn on a head of an observer, and an attachment member with which the image display device is attached to the wearing device and is an electronic device using the lithium ion secondary battery system of the first embodiment or the charging unit of the second embodiment according to the present technology as a driving electric power source. The band-type electronic device includes a plurality of segments connected in a band shape, a plurality of electronic components arranged in the plurality of segments, and a flexible circuit board connecting the plurality of electronic components in the plurality of segments and disposed in a meandering shape in at least one segment, and as the electronic component, for example, the lithium ion secondary battery system of the first embodiment or the charging unit of the second embodiment according to the present technology is disposed in the segment.

For example, the electronic circuit 401 includes CPU, a peripheral logic unit, an interface unit, and a storage unit, and controls the entire electronic device 400.

The battery pack 300 includes an assembled battery 301 and a charge-discharge circuit 302. The assembled battery 301 is formed by connecting a plurality of batteries 301a to each other in series and/or in parallel. For example, the plurality of batteries 301a are connected to each other in n-parallel m-series (each of n and m is a positive integer). FIG. 11 shows an example in which six batteries 301a are connected to each other in 2 parallel 3 series (2P3S). As the battery 301a, the lithium ion secondary battery system of the first embodiment may be used, or the charging unit of the second embodiment may be used.

During charging, the charge-discharge circuit 302 controls charging to the assembled battery 301. On the other hand, during discharging (that is, during use of the electronic device 400), the charge-discharge circuit 302 controls discharging to the electronic device 400.

EXAMPLES

Hereinafter, the effects of the present technology will be specifically described with examples. The scope of the present technology is not limited to the examples.

[Production of Lithium Ion Secondary Battery with Heat Flow Sensor]

NCA (lithium composite oxide containing lithium, nickel, cobalt, aluminum, and oxygen) was used as a positive electrode active material, and a positive electrode was produced. Then, graphite was used as a negative electrode active material, and a negative electrode was produced. As an electrolytic solution, EC (ethylene carbonate)/EMC (ethyl methyl carbonate)/VC (vinylene carbonate)/LiPF$_6$ (35/50/1/15 (mass %)) was used, and the positive electrode and the negative electrode were stacked with a separator interposed therebetween to produce a laminated film type 3 Ah lithium ion secondary battery. The use voltage range was 3 V to 4.2 V.

As the heat flow sensor, a thermopile type sensor using a polyimide film as a base material was used. The size was 10 mm (W)-31.6 mm (L)-0.28 mm (T), and the sensitivity was 0.04 μV/(W/m$^2$).

The heat flow sensor was attached to a laminate exterior surface of the lithium ion secondary battery to produce a lithium ion secondary battery in which the heat flow sensor was installed.

[Evaluation of lithium (Li) deposition] The lithium ion secondary battery produced above, in which the heat flow sensor was installed, was charged, a change in electromotive force of the heat flow sensor was measured, and a heat flow was calculated. The results are shown in FIGS. 2 to 6.

Figure 2:
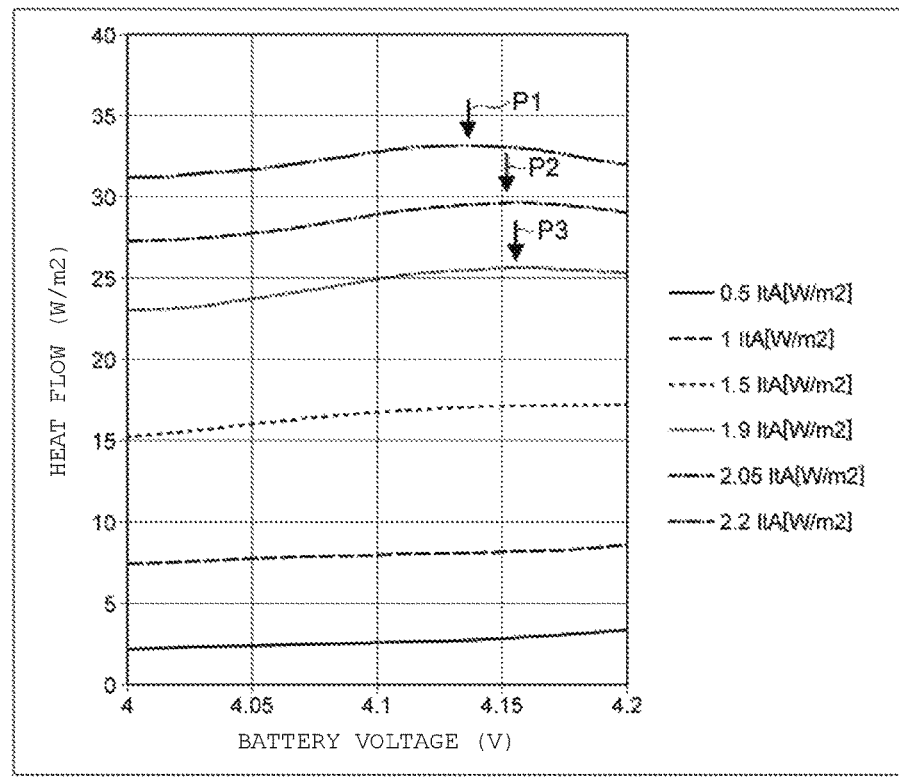
FIG. 2 is a graph showing a relationship between a battery voltage (V) and a heat flow (W/m$^2$).

FIG. 2 is a graph showing a relationship between a battery voltage (4 V to 4.2 V) and the detected heat flow (W/m$^2$) when constant current charging is performed while changing a charge current value (0.5 ItA to 2.2 ItA). As shown in FIG. 2, when the charge current value was increased, if the value exceeded 1.5 ItA, that is, at the arrow P1 of 2.2 ItA (battery voltage=4.14 V, heat flow value=33.1 W/m$^2$), the arrow P2 of 2.05 ItA (battery voltage=4.15 V, heat flow value=29.6 W/m$^2$) and the arrow P3 of 1.9 ItA (battery voltage=4.16 V, heat flow value=25.7 W/m$^2$), a maximum heat flow was indicated. The heat flow value started to decrease at the arrows P1 to P3 indicating the maximum heat flow, and the heat flow value continued to decrease until the maximum voltage was reached, indicating endothermic behavior. From this endothermic behavior, it was found that lithium (Li) was deposited from the points indicated by the arrows P1 to P3.

Figure 3:
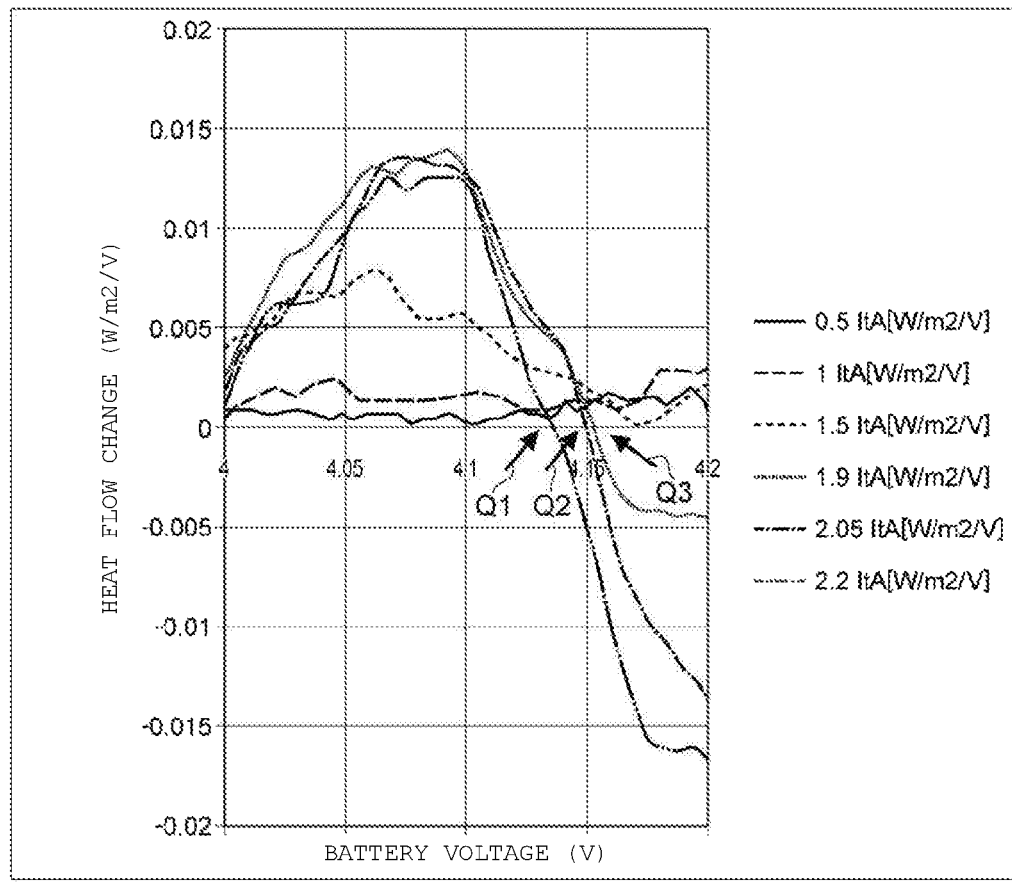
FIG. 3 is a graph showing a relationship between the battery voltage (V) and a heat flow change (W/m$^2$/V).

Furthermore, the endothermic behavior is analyzed. FIG. 3 is a graph showing a relationship between the battery voltage (4 V to 4.2 V) and a heat flow change (W/m$^2$/V) when constant current charging is performed while changing a current value (0.5 ItA to 2.2 ItA). As shown in FIG. 3, when the charge current value was increased, if the value exceeded 1.5 ItA, that is, at the arrow Q1 of 2.2 ItA (battery voltage=4.14 V, heat flow change=0 W/m$^2$/V), the arrow Q2 of 2.05 ItA (battery voltage=4.15 V, heat flow value change=0 W/m$^2$/V) and the arrow Q3 of 1.9 ItA (battery voltage=4.16 V, heat flow value=0 W/m$^2$/V), the heat flow change was converted into a negative value, and the negative value continued until the maximum voltage was reached, indicating endothermic behavior. From this endothermic behavior, it was found that lithium (Li) was deposited from the points indicated by the arrows Q1 to Q3.

Figure 4:
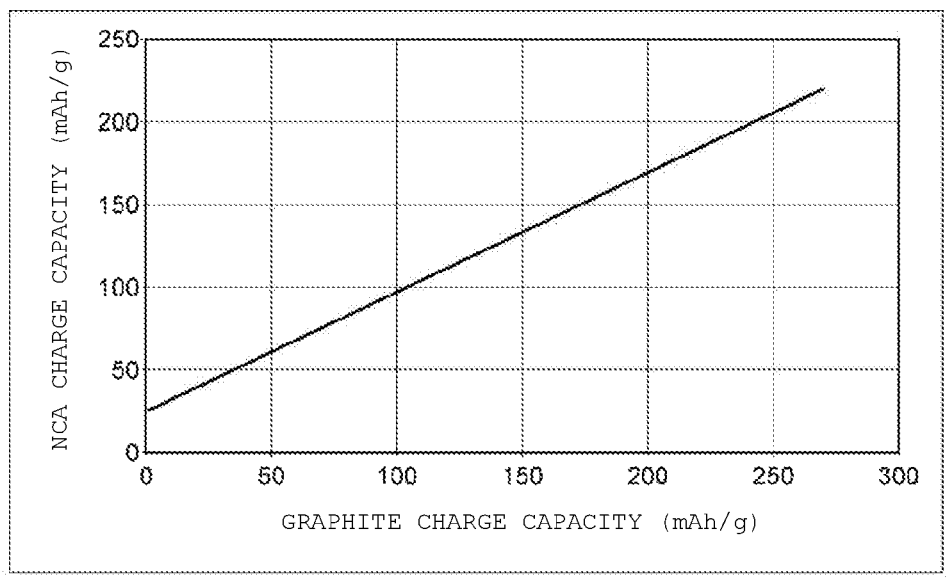
FIG. 4 is a graph showing a relationship between a graphite charge capacity (mAh/g) and a NCA charge capacity (mAh/g).

FIG. 4 is a graph showing a relationship between a graphite charge capacity (mAh/g) and a NCA charge capacity (mAh/g). A capacity threshold value for determining whether or not lithium (Li) is deposited for NCA is 60 mAh/g or more, and a capacity threshold value for determining whether or not lithium (Li) is deposited for graphite is 180 mAh/g or more. Therefore, as shown in FIG. 4, in the lithium ion secondary battery (NCA/graphite-based battery) produced in this example, of both threshold values, whether lithium (Li) is deposited is determined at 180 mAh/g or more of graphite with a deeper charge depth. The determination whether lithium (Li) is deposited at 180 mAh/g or more of graphite will be described in more detail with reference to FIGS. 5 and 6 below.

Figure 5:
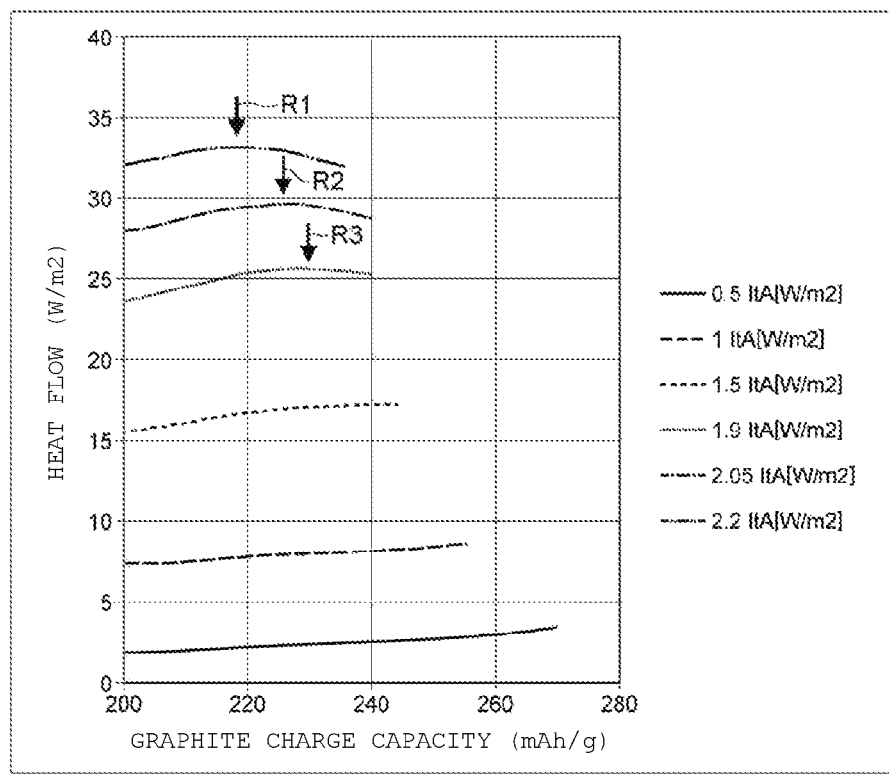
FIG. 5 is a graph showing a relationship between the graphite charge capacity (mAh/g) and the heat flow (W/m$^2$).

FIG. 5 is a graph showing a relationship between the graphite charge capacity (mAh/g) and the heat flow (W/m$^2$) when constant current charging is performed while changing a current value (0.5 ItA to 2.2 ItA). As shown in FIG. 5, when the charge current value was increased, if the value exceeded 1.5 ItA, that is, at the arrow R1 of 2.2 ItA (graphite charge capacity=219 mAh/g, heat flow value=33.1 W/m$^2$), the arrow R2 of 2.05 ItA (graphite charge capacity=225 mAh/g, heat flow value=29.6 W/m$^2$) and the arrow R3 of 1.9 ItA (graphite charge capacity=228 mAh/g, heat flow value=25.7 W/m$^2$), a maximum heat flow was indicated. The heat flow value started to decrease at the arrows R1 to R3 indicating the maximum heat flow, and the heat flow value continued to decrease until the maximum voltage was reached, indicating endothermic behavior. From this endothermic behavior, it was found that lithium (Li) was deposited from the points indicated by the arrows R1 to R3 where the graphite charge capacity was 180 mAh/g or more.

Figure 6:
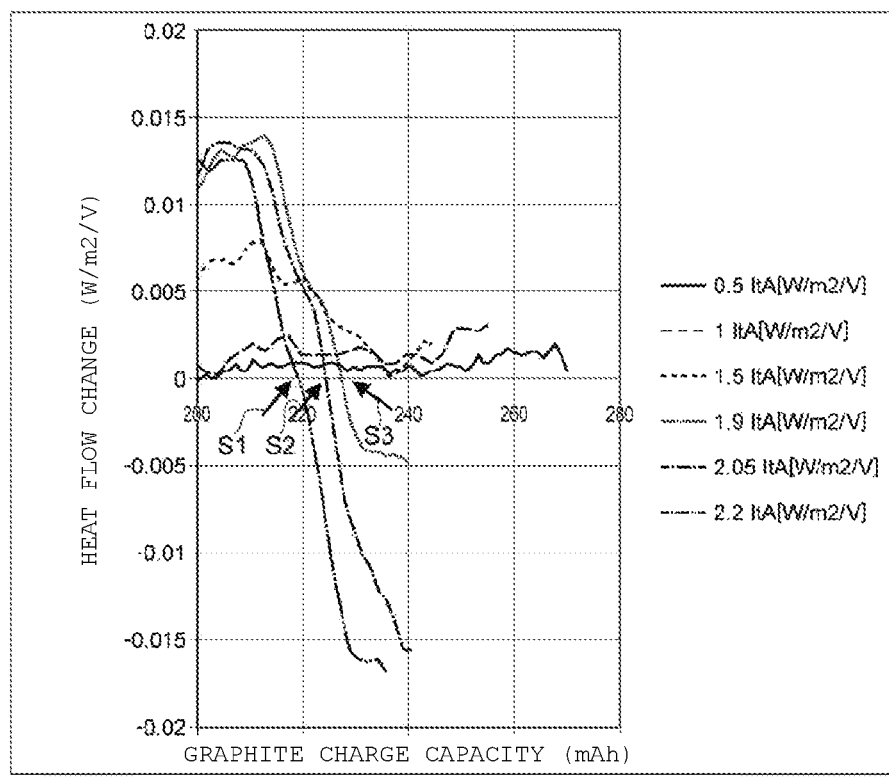
FIG. 6 is a graph showing a relationship between the graphite charge capacity (mAh/g) and the heat flow change (W/m$^2$/V).

FIG. 6 is a graph showing a relationship between the graphite charge capacity (mAh/g) and the heat flow change (W/m$^2$/V) when constant current charging is performed while changing a current value (0.5 ItA to 2.2 ItA). As shown in FIG. 6, when the charge current value was increased, if the value exceeded 1.5 ItA, that is, at the arrow S1 of 2.2 ItA (graphite charge capacity=219 mAh/g, heat flow change=0 W/m$^2$/V), the arrow S2 of 2.05 ItA (graphite charge capacity=225 mAh/g, heat flow value change=0 W/m$^2$/V) and the arrow S3 of 1.9 ItA (graphite charge capacity=228 mAh/g, heat flow value=0 W/m$^2$/V), the heat flow change was converted into a negative value, and the negative value continued until the maximum voltage was reached, indicating endothermic behavior. From this endothermic behavior, it was found that lithium (Li) was deposited from the points indicated by the arrows S1 to S3 where the graphite charge capacity was 180 mAh/g or more.

The values of charging rate (ItA), graphite charge capacity (Ah/g), battery voltage (V) and heat flow (W/m$^2$) for the arrows P1 to P3 in FIG. 2 and the arrows R1 to R3 in FIG. 5 are summarized in Table 1.

TABLE 1

| Charging rate [ItA] | Graphite capacity [mAh/g] | Voltage [V] | Heat flow [W/m2] |
| --- | --- | --- | --- |
| 1.9 | 228 | 4.16 | 25.7 |
| 2.05 | 225 | 4.15 | 29.6 |
| 2.20 | 219 | 4.14 | 33.1 |

The present technology may be any lithium ion secondary battery system that determines the presence or absence of lithium (Li) deposition by detecting endotherm of the lithium ion secondary battery, and is not limited to the above examples.

A plurality of lithium deposition sensors may be installed for one lithium ion secondary battery, or one lithium deposition sensor may be installed for a plurality of lithium ion secondary batteries.

The positive electrode active material is not limited to a nickel-based material (NCA-based material), but may be a lithium cobaltate-based material (LCO-based material), a nickel-cobalt-manganese ternary material (NCM-based material), a lithium manganate-based material (LMO-based material), or a lithium composite phosphate (for example, LiFePO$_4$). The negative electrode active material is not limited to graphite (carbon-based material), but may be a Si-based material, a Sn-based material, or a LTO-based material (lithium titanium composite oxide).

The lithium ion secondary battery is not limited to a stacked type one, but may be of a wound type, and is not limited to a laminated film type one, but may be of a cylindrical type, a rectangular type, a coin type, a button type, a disk type, or flat-plate type.

Hereinafter, the present technology will be more specifically described with application examples 1 to 5.

Application Example 1: Printed Circuit Board

Figure 12:
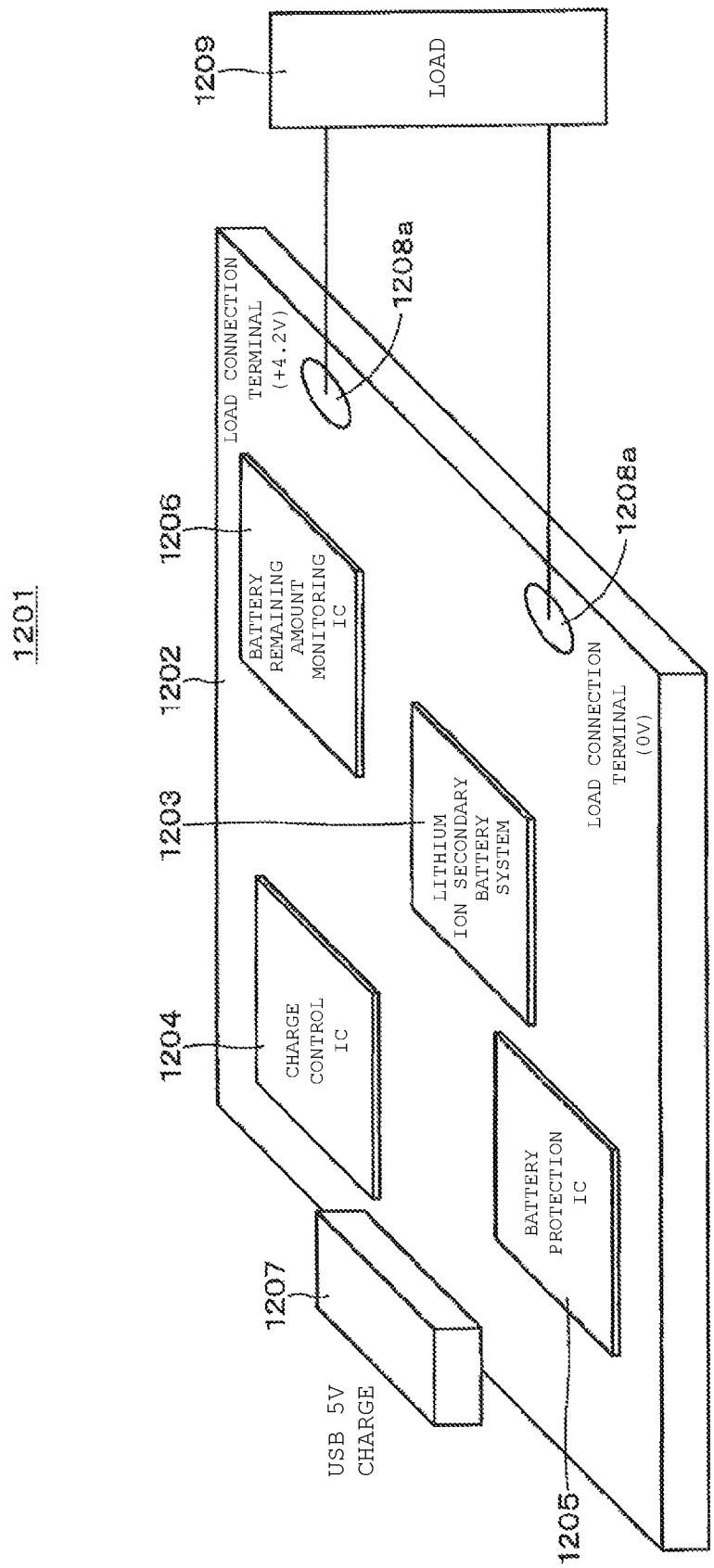
FIG. 12 is a view showing a configuration of an application example 1 (printed circuit board) of the lithium ion secondary battery system and the charging unit according to the present technology.

The above-described lithium ion secondary battery system or charging unit can be mounted together with a charging circuit or the like on a print circuit board (hereinafter referred to as "PCB") 1202 as shown in FIG. 12. For example, the lithium ion secondary battery system or the charging unit according to the present technology (in FIG. 12, of the lithium ion secondary battery system or the charging unit, a lithium ion secondary battery system 1203 is shown. The same applies below.) and an electronic circuit such as a charging circuit can be mounted on PCB 1202 by a reflow process.

An entity formed by mounting the lithium ion secondary battery system 1203 and an electronic circuit such as a charging circuit on the PCB 1202 is referred to as a battery module 1201. The battery module 1201 has a card type configuration as necessary, and can be configured as a portable card type mobile battery.

On the PCB 1202, a charge control IC (Integrated Circuit) 1204, a battery protection IC 1205, and a battery remaining amount monitoring IC 1206 are also formed. The battery protection IC 1205 controls charging/discharging operation so that the charging voltage does not become excessive at the time of charging/discharging, an overcurrent does not flow due to a load short circuit, and overdischarging does not occur.

A USB (Universal Serial Bus) interface 1207 is attached to the PCB 1202. The lithium ion secondary battery system 1203 is charged by electric power supplied through the USB interface 1207. In this case, the charging operation is controlled by the charge control IC 1204. Predetermined electric power (for example, a voltage of 4.2 V) is supplied to a load 1209 from load connection terminals 1208a and 1208b attached to the PCB 1202. The battery remaining amount of the lithium ion secondary battery system 1203 is monitored by the battery remaining amount monitoring IC 1206, so that an indication (not shown) indicating the battery remaining amount can be seen from the outside. The USB interface 1207 may be used for load connection.

Specific examples of the load 1209 described above are as follows:

A. Wearable devices (such as sports watches, watches, and hearing aids);

B. IoT terminals (such as sensor network terminals); C. amusement devices (portable game terminals, game controllers);

D. IC board embedded battery (real-time clock IC); and

E. Environmental power generation equipment (storage element for power generation elements, such as photovoltaic power generation, thermoelectric power generation, and vibration power generation).

Application Example 2: Universal Credit Card

Currently, many people carry a plurality of credit cards. However, there is a problem that, as the number of credit cards increases, the risk of loss, theft, and the like increases. Therefore, a card called a universal credit card, in which functions of a plurality of credit cards, point cards, and the like are aggregated into one card, has been put into practical use. For example, information, such as numbers, expiration dates, and the like of various credit cards and point cards, can be taken into this card, so that if such a card is put in a wallet or the like, a desired card can be selected and used at any time.

Figure 13:
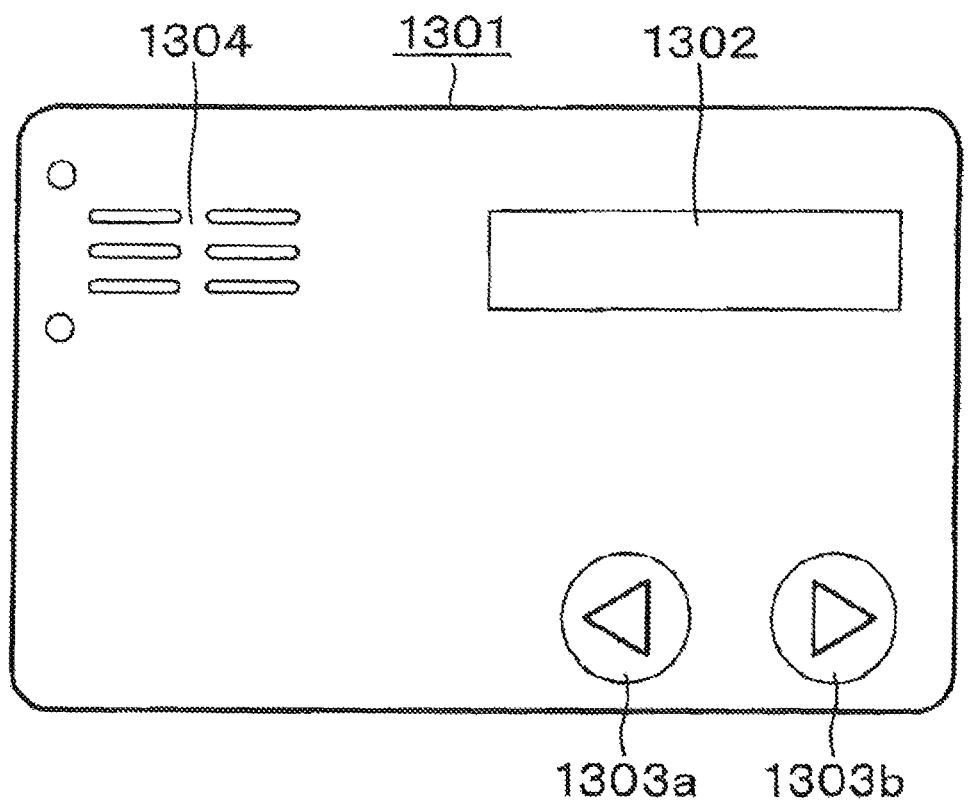
FIG. 13 is a view showing an example of a configuration of an application example 2 (universal credit card) of the lithium ion secondary battery system and the charging unit according to the present technology.

FIG. 13 shows an example of a configuration of a universal credit card 1301. The universal credit card has a card shape, and incorporates an IC chip and the lithium ion secondary battery system or the charging unit (not shown) according to the present technology. Furthermore, a display 1302 of low power consumption and operating units, such as direction keys 1303a and 1303b, are provided. Furthermore, a charging terminal 1304 is provided on a surface of the universal credit card 1301.

For example, the user can identify a credit card or the like loaded in the universal credit card 1301 in advance by operating the direction keys 1303a and 1303b while viewing the display 1302. When a plurality of credit cards are loaded in advance, information indicating each credit card is displayed on the display 1302, and the user can designate a desired credit card by operating the direction keys 1303a and 1303b. After that, the credit card can be used in a similar manner as a conventional credit card. It should be noted that the above is just an example, and it goes without saying that the lithium ion secondary battery system or the charging unit (not shown) according to the present technology can be applied to any electronic card other than the universal credit card 1301.

Application Example 3: Wristband-Type Electronic Device

An example of a wearable terminal is a wristband-type electronic device. Among such device, a wristband-type activity meter, also called a smart band, can acquire data relating to human activity, such as step count, moving distance, calorie consumption, sleep amount, heart rate, only by being wound around an arm. Furthermore, the acquired data can be managed by a smartphone. Furthermore, the wristband-type activity meter can be provided with an email sending and receiving function, and, for example, one having a notifying function of notifying the user of incoming email by a light emitting diode (LED) lamp and/or vibration is used.

Figure 14:
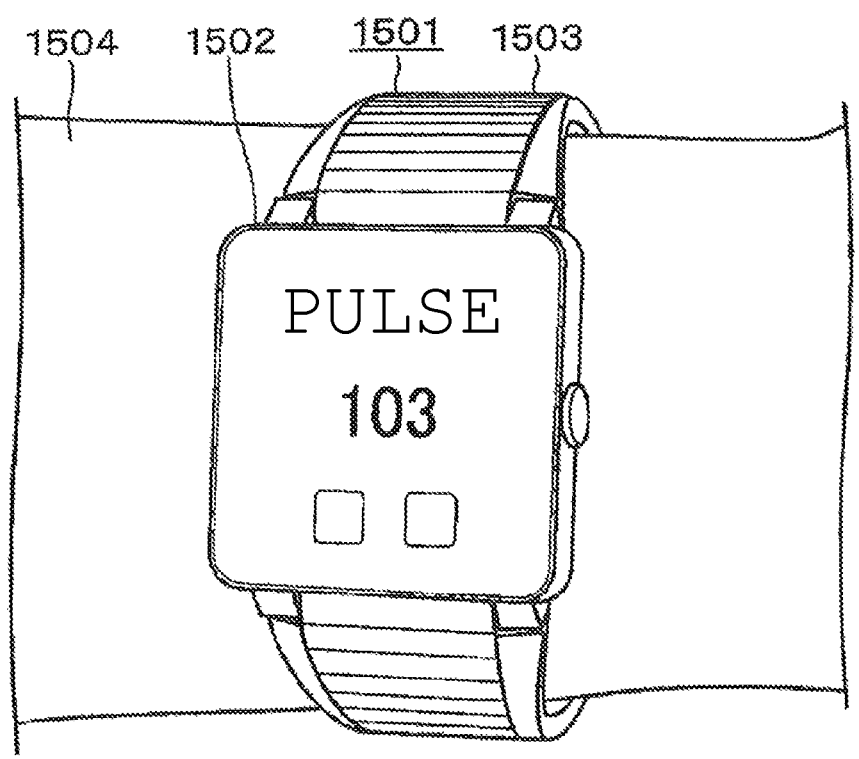
FIG. 14 is a view showing an example of a configuration of an application example 3 (wristband-type activity meter) of the lithium ion secondary battery system and the charging unit according to the present technology.
Figure 15:
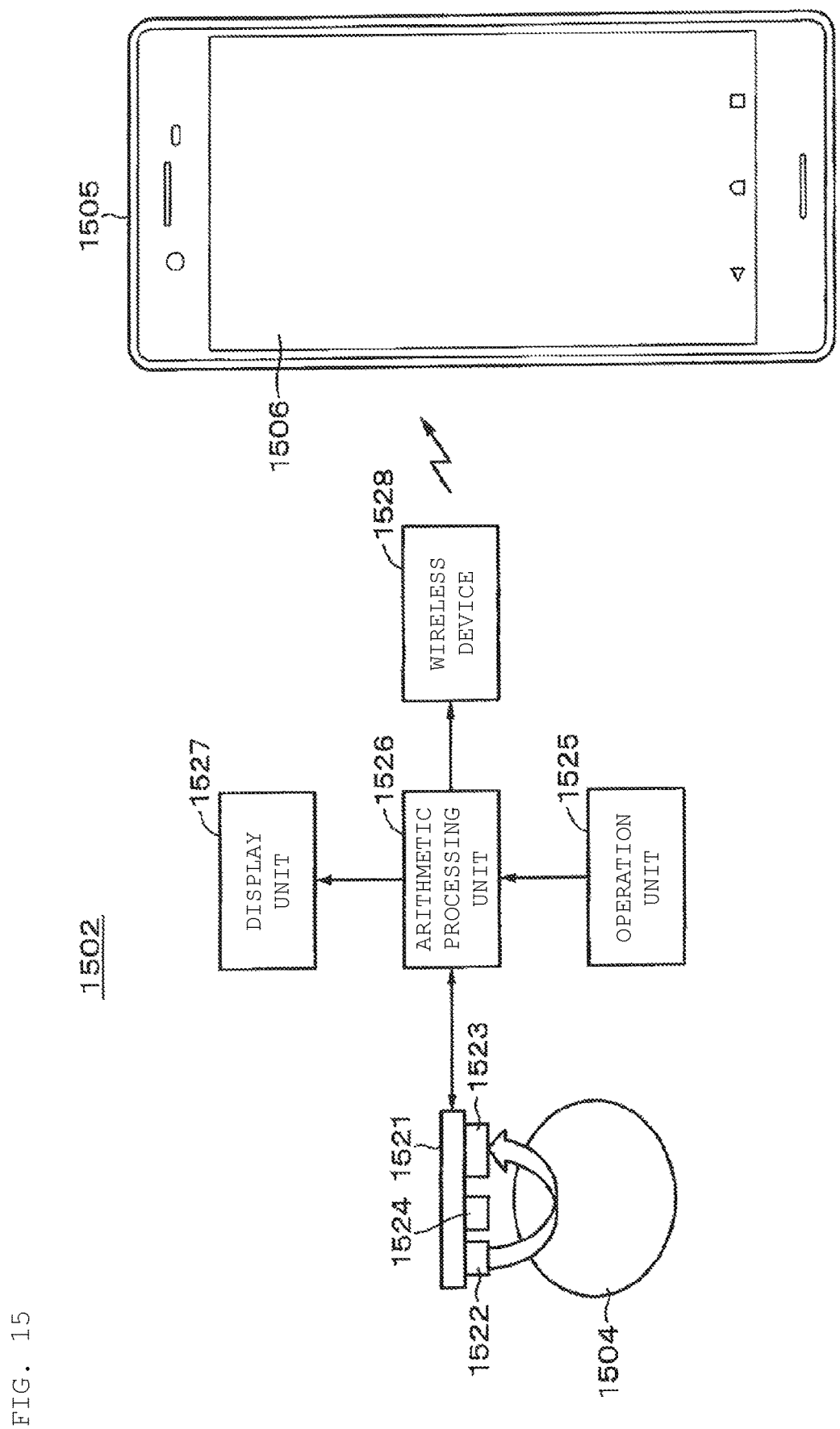
FIG. 15 is a view showing an example of a configuration of the application example 3 (wristband-type activity meter) of the lithium ion secondary battery system and the charging unit according to the present technology.

FIGS. 14 and 15 show an example of a wristband-type activity meter that measures, for example, a pulse. FIG. 14 shows a configuration example of an appearance of a wristband-type activity meter 1501. FIG. 15 shows a configuration example of a main body 1502 of the wristband-type activity meter 1501.

The wristband-type activity meter 1501 is a wristband-type measuring device for measuring, for example, a pulse of a subject by an optical method. As shown in FIG. 14, the wristband-type activity meter 1501 is configured with the main body 1502 and a band 1503, and the band 1503 is attached to an arm (wrist) 1504 of the subject, like a wristwatch. Then, the main body 1502 irradiates a portion including a pulse of the arm 1504 of the subject with measurement light of a predetermined wavelength, and measures the pulse of the subject based on intensity of returned light.

The main body 1502 is configured to include a substrate 1521, an LED 1522, a light receiving IC 1523, a light shield 1524, an operation unit 1525, an arithmetic processing unit 1526, a display unit 1527, and a wireless device 1528. The LED 1522, the light receiving IC 1523, and the light shield 1524 are provided on the substrate 1521. Under the control of the light receiving IC 1523, the LED 1522 irradiates a portion including a pulse of the arm 1504 of the subject with measurement light of a predetermined wavelength.

The light receiving IC 1523 receives light that returns after the arm 1504 is irradiated with the measurement light. The light receiving IC 1523 generates a digital measurement signal indicating the intensity of returned light and supplies the generated measurement signal to the arithmetic processing unit 1526.

The light shield 1524 is provided between the LED 1522 and the light receiving IC 1523 on the substrate 1521. The light shield 1524 prevents measurement light from the LED 1522 from directly entering the light receiving IC 1523.

The operation unit 1525 is configured with various operation members, such as buttons and switches, and is provided on a surface of the main body 1502 or the like. The operation unit 1525 is used for operating the wristband-type activity meter 1501 and supplies a signal indicating the operation content to the arithmetic processing unit 1526.

The arithmetic processing unit 1526 performs arithmetic processing for measuring a pulse of the subject based on the measurement signal supplied from the light receiving IC 1523. The arithmetic processing unit 1526 supplies the measurement result of the pulse to the display unit 1527 and the wireless device 1528.

The display unit 1527 is configured with, for example, a display device, such as a liquid crystal display (LCD) and is provided on a surface of the main body 1502. The display unit 1527 displays the measurement result of the pulse of the subject and the like.

The wireless device 1528 transmits the measurement result of the pulse of the subject to an external device by wireless communication of a predetermined scheme. For example, as shown in FIG. 15, the wireless device 1528 transmits the measurement result of the pulse of the subject to a smartphone 1505, and displays the measurement result on a screen 1506 of the smartphone 1505. Furthermore, data of the measurement result is managed by the smartphone 1505, and the measurement result can be viewed by the smartphone 1505 or can be stored in a server on a network. An optional system can be employed as a communication system of the wireless device 1528. The light receiving IC 1523 can also be used to measure a pulse at a portion (for example, a finger, an earlobe, or the like) other than the arm 1504 of the subject.

The above-described wristband-type activity meter 1501 can accurately measure a pulse wave and a pulse of the subject by removing the influence of a body movement by signal processing in the light receiving IC 1523. For example, even if the subject performs vigorous exercise, such as running, it is possible to accurately measure a pulse wave and a pulse of the subject. Further, for example, even in a case where the subject wears the wristband-type activity meter 1501 for a long time to perform measurement, a pulse wave and a pulse can be measured accurately by removing the influence of a body movement of the subject.

By reducing an amount of calculation, power consumption of the wristband-type activity meter 1501 can be reduced. As a result, it becomes possible to perform the measurement by attaching the wristband-type activity meter 1501 to the subject for a long time without, for example, charging or replacing the battery.

As an electric power source, for example, a thin battery is stored in the band 1503. The wristband-type activity meter 1501 includes an electronic circuit of a main body and a battery pack. For example, the battery pack is configured to be detachable by the user. The electronic circuit is a circuit included in the above-described main body 1502. The present technology can be applied when a lithium ion secondary battery system or a charging unit is used as an electric power source.

Figure 16:
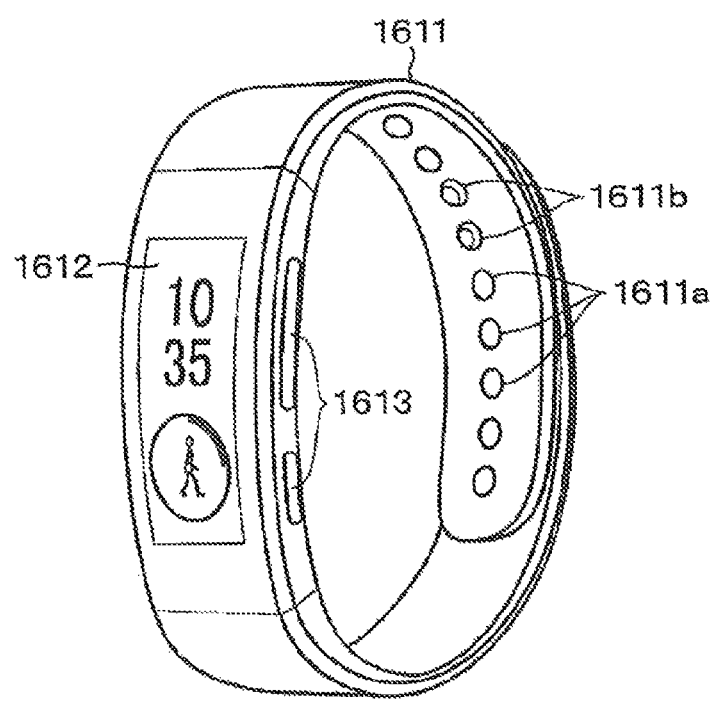
FIG. 16 is a view showing a configuration of the application example 3 (wristband-type electronic device) of the lithium ion secondary battery system and the charging unit according to the present technology.

FIG. 16 shows a configuration example of an appearance of wristband-type electronic device 1601 (hereinafter simply referred to as "electronic device 1601").

The electronic device 1601 is, for example, what is called a wearable device which is a watch type and detachably attached to a human body. The electronic device 1601 includes, for example, a band portion 1611 attached to an arm, a display device 1612 for displaying numerals, characters, symbols, and the like, and an operation button 1613. On the band portion 1611, a plurality of holes 1611a and a protrusion 1611b are formed on an inner peripheral surface (a surface in contact with an arm when the electronic device 1601 is mounted) side.

In a use state, the electronic device 1601 is bent so that the band portion 1611 has a substantially circular shape as shown in FIG. 16, and has the protrusion 1611b inserted into the hole 1611a so as to be attached to an arm. By adjusting a position of the hole 1611a into which the protrusion 1611b is inserted, degree of a diameter can be adjusted in accordance with a thickness of an arm. When the electronic device 1601 is not in use, the protrusion 1611b is removed from the hole 1611a, and the band portion 1611 is stored in a substantially flat state. A sensor according to an embodiment of the present technology is provided over, for example, the entire band portion 1611.

Application Example 4: Smart Watch

A smart watch has an appearance like or similar to a design of an existing watch and is used by being attached to an arm of the user like a wrist watch, and has a function of notifying the user of various messages of an incoming call, received email, and the like with information shown on a display. Furthermore, a smart watch having functions, such as an electronic money function, an activity meter, and the like has been proposed. The smart watch has a display incorporated on a surface of a main body portion of electronic device, and various pieces of information are shown on the display. Further, the smart watch can cooperate with a function, content, and the like of a communication terminal and the like by, for example, performing short-distance wireless communication, such as Bluetooth (registered trademark), with a communication terminal (smart phone or the like).

As one of the smart watches, one that includes a plurality of segments connected in a band shape, a plurality of electronic components arranged in the plurality of segments, and a flexible circuit board that connects the plurality of electronic components in the plurality of segments and is arranged in a meandering shape in at least one segment has been proposed. By having such a meandering shape, stress is not applied to the flexible circuit board even if the band is bent, and disconnection of the circuit is prevented. Further, an electronic circuit component can be built in a segment on the band side attached to a watch main body, instead of a housing constituting the watch main body, and there is no need to change the watch main body side. Accordingly, it is possible to configure a smart watch of a design similar to that of a conventional watch. Further, the smart watch of the present application example can perform notification of email and an incoming call, recording of a log, such as an activity history of the user, calling, and the like. Furthermore, the smart watch includes a function as a non-contact type IC card, and can perform settlement, authentication, and the like in a non-contact manner.

The smart watch of the present application example incorporates a circuit component for performing communication processing and notification processing in a metallic band. In order for the smart watch to function as electronic device while reducing a thickness of the metallic band, the band has a configuration in which a plurality of segments are connected, and a circuit board, a vibration motor, a battery, and an acceleration sensor are stored in each segment. Components, such as a circuit board, a vibration motor, a battery, an acceleration sensors, and the like, of each segment are connected by a flexible printed circuit board (FPC).

Figure 17:
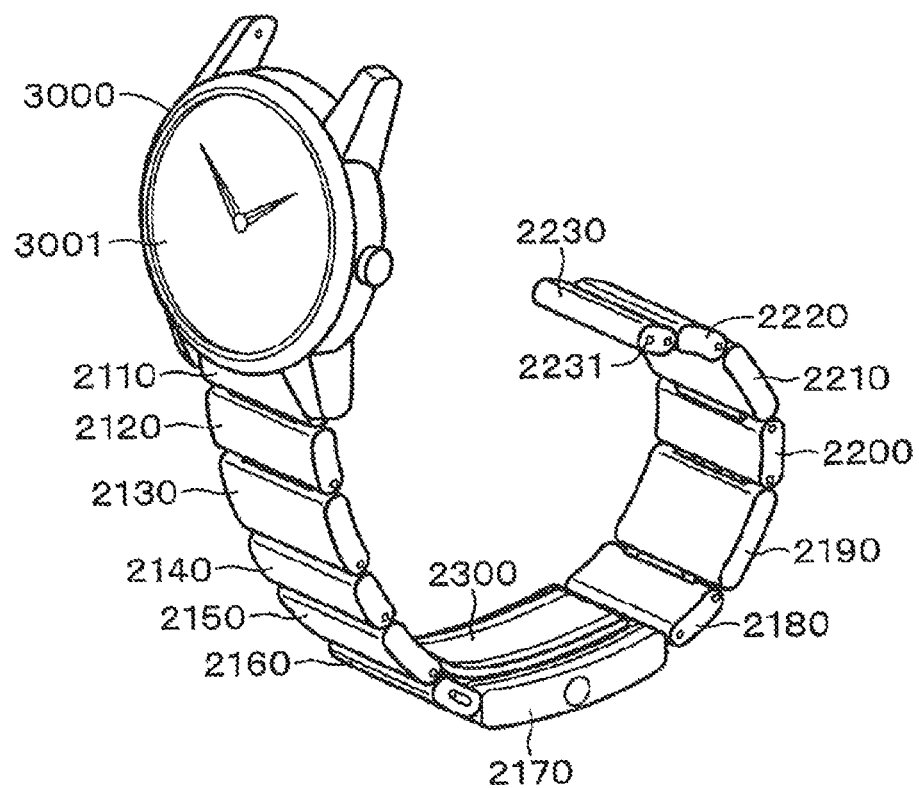
FIG. 17 is an exploded perspective view showing a configuration of an application example 4 (smart watch) of the lithium ion secondary battery system and the charging unit according to the present technology.

FIG. 17 shows an entire configuration (exploded perspective view) of the smart watch. A band-type electronic device 2000 is a metallic band attached to a watch main body 3000 and is attached to an arm of the user. The watch main body 3000 includes a dial 3100 for displaying a time. Instead of the dial 3100, the watch main body 3000 may electronically display a time on a liquid crystal display or the like.

The band-type electronic device 2000 has a configuration in which a plurality of segments 2110 to 2230 are connected. The segment 2110 is attached to one band attachment hole of the watch main body 3000 and the segment 2230 is attached to the other band attachment hole of the watch main body 3000. In this example, each of the segments 2110 to 2230 is made from metal.

(Outline of Inside of Segment)

Figure 18:
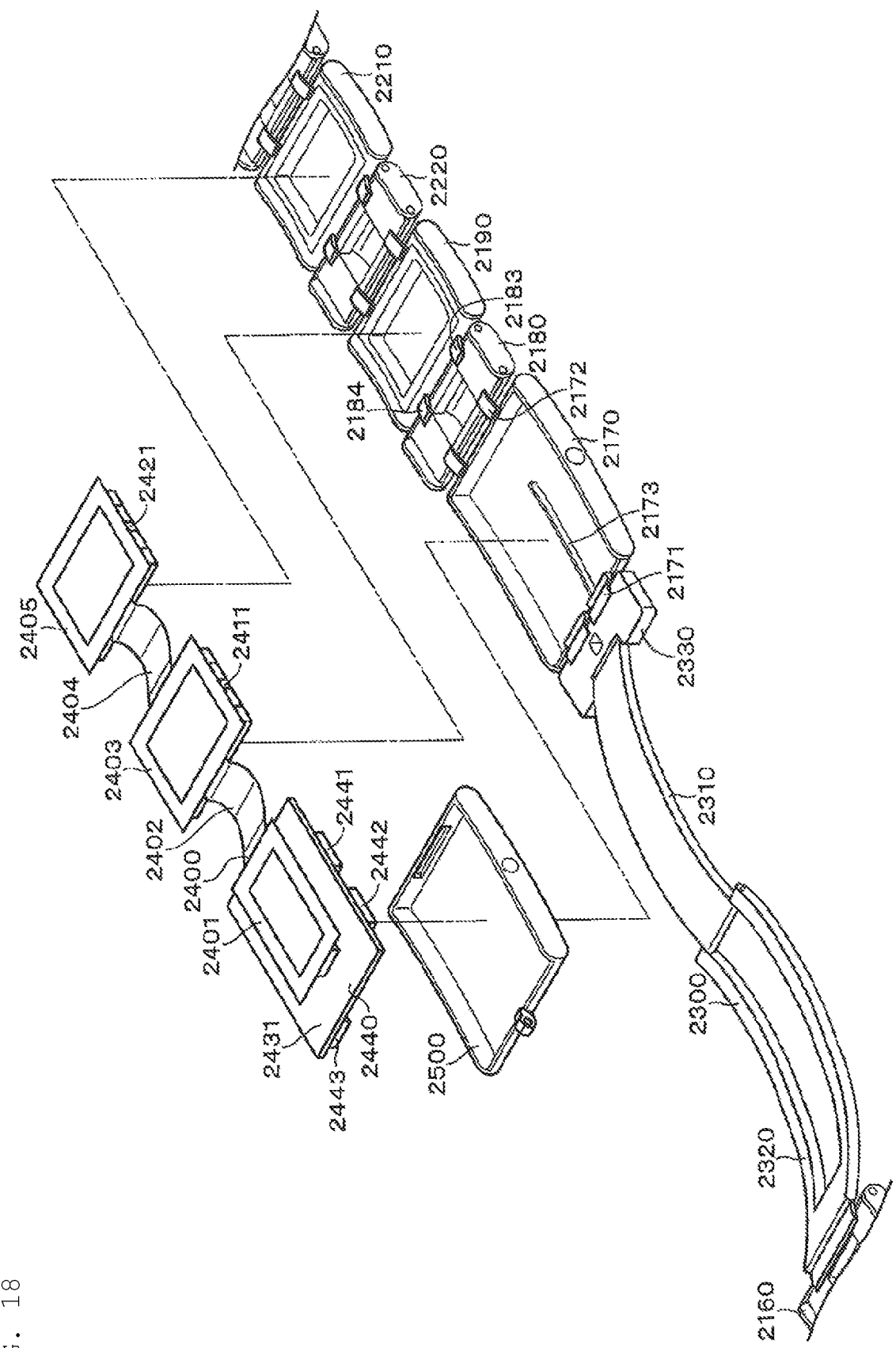
FIG. 18 is a view showing a part of an internal configuration of the application example 4 (band-type electronic device) of the lithium ion secondary battery system and the charging unit according to the present technology.

FIG. 18 shows part of an internal configuration of the band-type electronic device 2000. For example, the insides of three segments 2170, 2180, 2190, 2200, and 2210 are shown. In the band-type electronic device 2000, a flexible circuit board 2400 is arranged in the inside of five of the consecutive segments 2170 to 2210. Various electronic components are arranged in the segment 2170, and batteries 2411 and 2421, which are the lithium ion secondary batteries or the charging units according to the present technology, are arranged in the segments 2190 and 2210, and these components are electrically connected by the flexible circuit board 2400. The segment 2180 between the segment 2170 and the segment 2190 is of a comparatively small size and a meandering flexible circuit board 2400 is disposed in the segment 2180. In the inside of the segment 2180, the flexible circuit board 2400 is disposed in a state sandwiched between waterproof members. The inside of the segments 2170 to 2210 has a waterproof structure.

(Circuit Configuration of Smart Watch)

Figure 19:
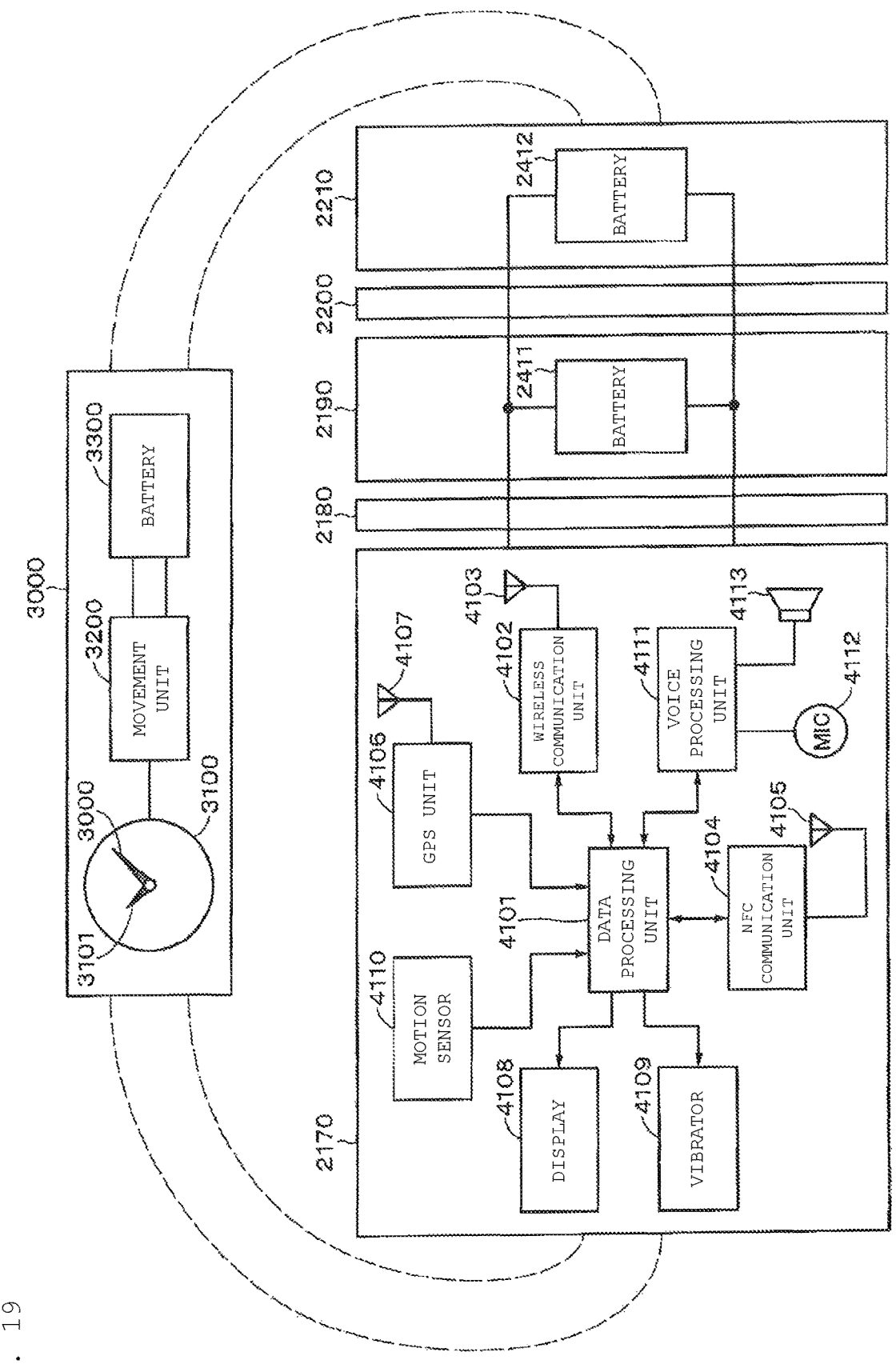
FIG. 19 is a block diagram showing a circuit configuration of the application example 4 (band-type electronic device) of the lithium ion secondary battery system and the charging unit according to the present technology.

FIG. 19 is a block diagram showing a circuit configuration of the band-type electronic device 2000. A circuit in the inside of the band-type electronic device 2000 has a configuration independent of the watch main body 3000. The watch main body 3000 includes a movement unit 3200 that rotates hands of watch disposed on the dial 3100. A battery 3300 is connected to the movement unit 3200. The movement unit 3200 and the battery 3300 are incorporated in a housing of the watch main body 3000.

In the band-type electronic device 2000 connected to the watch main body 3000, electronic components are arranged in three of the segments 2170, 2190, and 2210. In the segment 2170, a data processing unit 4101, a wireless communication unit 4102, an NFC communication unit 4104, and a GPS unit 4106 are arranged. Antennas 4103,

4105, and 4107 are connected to the wireless communication unit 4102, the NFC communication unit 4104, and the GPS unit 4106, respectively. The antennas 4103, 4105, and 4107 are arranged in the vicinity of a slit 2173, which will be described later, of the segment 2170.

The wireless communication unit 4102 performs short-distance wireless communication with other terminals according to, for example, the Bluetooth (registered trademark) standard. The NFC communication unit 4104 performs wireless communication with an adjacent reader/writer under the NFC standard. The GPS unit 4106 is a positioning unit that receives a radio wave from a satellite of a system called a global positioning system (GPS) and performs positioning of a current position. Data obtained by the wireless communication unit 4102, the NFC communication unit 4104, and the GPS unit 4106 is supplied to the data processing unit 4101.

Further, in the segment 2170, a display 4108, a vibrator 4109, a motion sensor 4110, and a voice processing unit 4111 are arranged. The display 4108 and the vibrator 4109 function as a notification unit for performing notification to a wearer of the band-type electronic device 2000. The display 4108 is configured with a plurality of light emitting diodes, and performs notification to the user by turning on or blinking the light emitting diodes. The plurality of light emitting diodes are disposed, for example, inside the slit 2173, which will be described later, of the segment 2170, and give notification of an incoming telephone call, receiving of email, and the like by turning on or blinking. As the display 4108, a type that displays characters, numbers, and the like may be used. The vibrator 4109 is a member that vibrates the segment 2170. The band-type electronic device 2000 gives notification of an incoming telephone call, receiving of email, and the like by the vibrator 4109 vibrating the segment 2170.

The motion sensor 4110 detects a movement of the user who wears the band-type electronic device 2000. As the motion sensor 4110, an acceleration sensor, a gyro sensor, an electronic compass, an atmospheric pressure sensor, or the like is used. Further, the segment 2170 may incorporate a sensor other than the motion sensor 4110. For example, a biosensor for detecting a pulse or the like of the user wearing the band-type electronic device 2000 may be incorporated. A microphone 4112 and a speaker 4113 are connected to the voice processing unit 4111, and the voice processing unit 4111 performs calling processing with a party connected by wireless communication by the wireless communication unit 4102. Further, the voice processing unit 4111 can also perform processing for voice input operation.

Then, the battery 2411 is incorporated in the segment 2190, and the battery 2421 is incorporated in the segment 2210. The batteries 2411 and 2421 can be configured with the lithium ion secondary battery or the charging unit according to the present technology, and supply power for driving to circuits in the segment 2170. The circuit in the segment 2170 and the batteries 2411 and 2421 are connected by the flexible circuit board 2400 (FIG. 18). Although not shown in FIG. 19, the segment 2170 includes terminals for charging the batteries 2411 and 2421. Further, electronic components other than the batteries 2411 and 2421 may be arranged in the segments 2190 and 2210. For example, the segments 2190 and 2210 may include a circuit for controlling charging and discharging of the batteries 2411 and 2421.

Application Example 5: Glasses-Type Terminal

In a glasses-type terminal described below, information, such as text, symbols, images, and the like, can be superimposed and displayed on a landscape in front of the eyes. That is, the glasses-type terminal is mounted with a lightweight and thin image display device display module dedicated to a transmissive glasses-type terminal. Typically, there is a head mounted display (HMD).

This image display device includes an optical engine and a hologram light-guiding plate. The optical engine emits image light of an image, text, and the like by using a micro display lens. This image light enters the hologram light guide plate. The hologram light guide plate is one in which hologram optical elements are incorporated at both end portions of a transparent plate, and the image light from the optical engine propagates through a very thin transparent plate having a thickness, such as 1 mm, to reach eyes of an observer. With such a configuration, a lens having a thickness of 3 mm (including a protective plate around the light-guiding plate) having a transmittance of, for example, 85% is obtained. With such a glasses-type terminal, it is possible to view results of players and teams in real time during sports watching, or to display the sightseeing guide at a travel destination.

Figure 20:
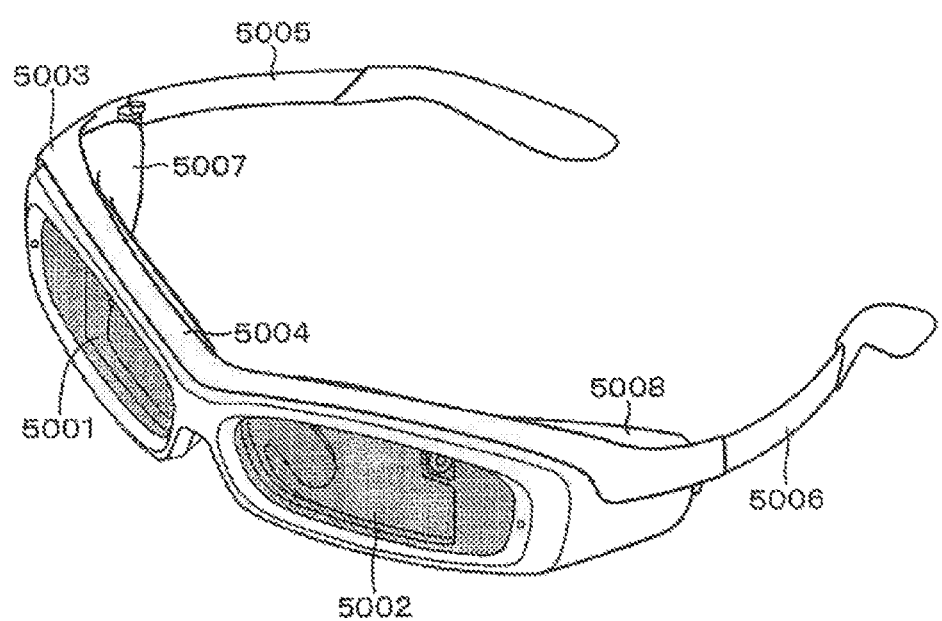
FIG. 20 is a diagram showing a specific example of a configuration of an application example 5 (glasses-type terminal) of the lithium ion secondary battery system and the charging unit according to the present technology.

In a specific example of the glasses-type terminal, as shown in FIG. 20, an image display unit has a glasses-type configuration. That is, like usual glasses, a frame 5003 for holding a right image display portion 5001 and a left image display portion 5002 is provided in front of eyes. The frame 5003 is composed of a front portion 5004 disposed on the front of an observer and two temple portions 5005 and 5006 pivotally attached to both ends of the front portion 5004 via hinges. The frame 5003 is made from the same material as the material constituting ordinary glasses, such as metal, an alloy, plastic, or a combination of these. A headphone unit may be provided.

The right image display portion 5001 and the left image display portion 5002 are arranged so as to be positioned in front of a right eye and a left eye of the user, respectively. The temple portions 5005 and 5006 hold the image display portions 5001 and 5002 on the head of the user, respectively. A right display driving unit 5007 is disposed on an inner side of the temple portion 5005 at a connection portion between the front portion 5004 and the temple portion 5005. A left display driving unit 5008 is disposed on an inner side of the temple portion 5006 at a connection portion between the front portion 5004 and the temple portion 5006.

Although not shown in FIG. 20, the lithium ion secondary battery system or the charging unit according to the present technology, an acceleration sensor, a gyro sensor, an electronic compass, a microphone/speaker, and the like are mounted on the frame 5003. Furthermore, an imaging device is attached, and shooting of still images/moving images is enabled. Furthermore, a controller connected to an eyeglass part by, for example, a wireless or wired interface is included. The controller is provided with a touch sensor, various buttons, a speaker, a microphone, and the like. Furthermore, a linkage function with a smartphone is also included. For example, a GPS function of a smartphone can be utilized to provide information according to a situation of the user.

The present technology is not limited to the above-described embodiments, examples, and application examples, and can be modified within a range not deviating from the gist of the present technology.

Note that, the effect of the present technology can be obtained without depending on a type of an electrode reactant as long as the electrode reactant is used for a battery. Accordingly, even if the type of the electrode reactant is changed, a similar effect can be obtained. Further, the chemical formulas of compounds and the like are representative and are not limited to the described valences and the like as long as common names of the same compounds are used.

The present technology may also take the following configurations.

[1]

A lithium ion secondary battery system including at least: a lithium ion secondary battery including a positive electrode and a negative electrode; and a lithium deposition sensor, wherein the lithium deposition sensor includes an endotherm detector, and the endotherm detector detects endotherm in a constant current charging range.

[2]

The lithium ion secondary battery system according to [1], further including a sensor measurement section and a lithium deposition determination calculation section.

[3]

The lithium ion secondary battery system according to [1] or [2], wherein the endotherm detector continuously detects endotherm up to an ultimate voltage in the constant current charging range, and the lithium deposition sensor detects lithium deposition.

[4]

The lithium ion secondary battery system according to any one of [1] to [3], wherein the negative electrode contains a negative electrode active material, and the endotherm detector detects endotherm in a constant current charging range where there is no endothermic reaction due to a structural change of the negative electrode active material.

[5]

The lithium ion secondary battery system according to [4], wherein the negative electrode active material is a carbon-based material, and the endotherm detector detects endotherm in a constant current charging range where a charge capacity of the negative electrode exceeds 180 mAh/g.

[6]

The lithium ion secondary battery system according to any one of [1] to [5], wherein the positive electrode contains a positive electrode active material, and the endotherm detector detects endotherm in a constant current charging range where there is no endothermic reaction due to a structural change of the positive electrode active material.

[7]

The lithium ion secondary battery system according to [6], wherein the positive electrode active material is a lithium cobaltate-based material (LCO-based material) or a nickel-based material (NCA-based material), and the endotherm detector detects endotherm in a constant current charging range where a charge capacity of the positive electrode exceeds 60 mAh/g.

[8]

The lithium ion secondary battery system according to [6], wherein the positive electrode active material is a nickel-cobalt-manganese ternary material (NCM-based material), and the endotherm detector detects endotherm in a constant current charging range where a charge capacity of the positive electrode exceeds 100 mAh/g.

[9]

The lithium ion secondary battery system according to [6], wherein the positive electrode active material is a lithium manganate-based material (LMO-based material), and the endotherm detector detects endotherm in a constant current charging range where a charge capacity of the positive electrode exceeds 70 mAh/g.

[10]

The lithium ion secondary battery system according to any one of [1] to [9], wherein the endotherm detector detects endotherm in a voltage range of 80% or more of a use voltage range during charging.

[11]

The lithium ion secondary battery system according to any one of [1] to [10], wherein the endotherm detector includes a thermometer or a heat flow sensor.

[12]

A charging unit including the lithium ion secondary battery system according to any one of [1] to [11], a current measuring section, a voltage measuring section, and a charge control section.

[13]

A method of controlling a lithium ion secondary battery, the method including controlling a charging current in a constant current charging range based on an endotherm detection result of an endotherm detector included in a lithium deposition sensor.

[14]

The method according to [13], wherein the endotherm detection result of the endotherm detector indicates whether or not endotherm continues up to an ultimate voltage in the constant current charging range.

[15]

A method of controlling a lithium ion secondary battery, the method including controlling an ultimate voltage in a constant current charging range based on an endotherm detection result of an endotherm detector included in a lithium deposition sensor.

[16]

The method according to [15], wherein the endotherm detection result of the endotherm detector indicates whether or not endotherm continues up to the ultimate voltage in the constant current charging range.

[17]

A battery pack including the lithium ion secondary battery system according to any one of [1] to [11].

[18]

A battery pack including:

the lithium ion secondary battery system according to any one of [1] to [11];

a control section that controls a usage state of the lithium ion secondary battery system; and a switch section that switches the usage state of the lithium ion secondary battery system in response to an instruction from the control section.

[19]

A vehicle including:

the lithium ion secondary battery system according to any one of [1] to [11];

a driving force conversion device that receives a supply of electric power from the lithium ion secondary battery system and converts the electric power into a driving force of the vehicle;

a drive section that drives according to the driving force; and a vehicle control device.

[20]
A power storage system including:
a power storage device including the lithium ion secondary battery system according to any one of [1] to [11];
a power consumption device to which electric power is supplied from the lithium ion secondary battery system;
a control device that controls the electric power supply from the lithium ion secondary battery system to the power consumption device; and
a power generation device that charges the lithium ion secondary battery system.

[21]
An electric tool including:
the lithium ion secondary battery system according to any one of [1] to [11]; and
a movable section to which electric power is supplied from the lithium ion secondary battery system.

[22]
An electronic device including the lithium ion secondary battery system according to any one of [1] to [11],
and wherein the electronic device receives a supply of electric power from the lithium ion secondary battery system.

[23]
A battery pack including the charging unit according to [12].

[24]
A battery pack including:
the charging unit according to [12];
a control section that controls a usage state of the charging unit; and
a switch section that switches the usage state of the charging unit in response to an instruction from the control section.

[25]
A vehicle including:
the charging unit according to [12];
a driving force conversion device that receives a supply of electric power from the charging unit and converts the electric power into a driving force of the vehicle;
a drive section that drives according to the driving force; and
a vehicle control device.

[26]
A power storage system including:
the power storage device including the charging unit according to [12];
a power consumption device to which electric power is supplied from the charging unit;
a control device that controls the electric power supply from the charging unit to the power consumption device; and
a power generation device that charges the charging unit.

[27]
An electric tool including:
the charging unit according to [12]; and
a movable section to which electric power is supplied from the charging unit.

[28]
An electronic device including the charging unit according to [12],
wherein the electronic device receives a supply of electric power from the charging unit.

DESCRIPTION OF REFERENCE SYMBOLS

1: Lithium deposition sensor
2: Lithium ion secondary battery
3: Sensor measurement section
4: Lithium (Li) deposition determination calculation section
5: Current measuring section
6: Voltage measuring section
7: Charge control section
10: Lithium ion secondary battery system
100: Charging unit

The invention claimed is:

1. A lithium ion secondary battery system comprising at least: a lithium ion secondary battery including a positive electrode and a negative electrode; and
a lithium deposition sensor,
wherein the lithium deposition sensor includes an endotherm detector, and
the endotherm detector detects endotherm in a constant current charging range.

2. The lithium ion secondary battery system according to claim 1, further comprising a sensor measurement section and a lithium deposition determination calculation section.

3. The lithium ion secondary battery system according to claim 1, wherein the endotherm detector continuously detects endotherm up to an ultimate voltage in the constant current charging range, and the lithium deposition sensor detects lithium deposition.

4. The lithium ion secondary battery system according to claim 1, wherein the negative electrode contains a negative electrode active material, and
the endotherm detector detects endotherm in a constant current charging range where there is no endothermic reaction due to a structural change of the negative electrode active material.

5. The lithium ion secondary battery system according to claim 4, wherein the negative electrode active material is a carbon-based material, and
the endotherm detector detects endotherm in a constant current charging range where a charge capacity of the negative electrode exceeds 180 mAh/g.

6. The lithium ion secondary battery system according to claim 1, wherein the positive electrode contains a positive electrode active material, and
the endotherm detector detects endotherm in a constant current charging range where there is no endothermic reaction due to a structural change of the positive electrode active material.

7. The lithium ion secondary battery system according to claim 6, wherein the positive electrode active material is a lithium cobaltate-based material (LCO-based material) or a nickel-based material (NCA-based material), and
the endotherm detector detects endotherm in a constant current charging range where a charge capacity of the positive electrode exceeds 60 mAh/g.

8. The lithium ion secondary battery system according to claim 6, wherein the positive electrode active material is a nickel-cobalt-manganese ternary material (NCM-based material), and
the endotherm detector detects endotherm in a constant current charging range where a charge capacity of the positive electrode exceeds 100 mAh/g.

9. The lithium ion secondary battery system according to claim 6, wherein the positive electrode active material is a lithium manganate-based material (LMO-based material), and
the endotherm detector detects endotherm in a constant current charging range where a charge capacity of the positive electrode exceeds 70 mAh/g.

10. The lithium ion secondary battery system according to claim 1, wherein the endotherm detector detects endotherm in a voltage range of 80% or more of a use voltage range during charging.

11. The lithium ion secondary battery system according to claim 1, wherein the endotherm detector includes a thermometer or a heat flow sensor.

12. A charging unit comprising:
the lithium ion secondary battery system according to claim 1;
a current measuring section;
a voltage measuring section; and
a charge control section.

13. A charging unit comprising:
the lithium ion secondary battery system according to claim 2;
a current measuring section;
a voltage measuring section; and
a charge control section.

14. A method of controlling a lithium ion secondary battery, the method comprising controlling a charging current in a constant current charging range based on an endotherm detection result of an endotherm detector included in a lithium deposition sensor.

15. The method according to claim 14, wherein the endotherm detection result of the endotherm detector indicates whether or not endotherm continues up to an ultimate voltage in the constant current charging range.

16. A method of controlling a lithium ion secondary battery, the method comprising controlling an ultimate voltage in a constant current charging range based on an endotherm detection result of an endotherm detector included in a lithium deposition sensor.

17. The method according to claim 16, wherein the endotherm detection result of the endotherm detector indicates whether or not endotherm continues up to the ultimate voltage in the constant current charging range.

18. A battery pack comprising the lithium ion secondary battery system according to claim 1.

19. A vehicle comprising:
the lithium ion secondary battery system according to claim 1;
a driving force conversion device that receives a supply of electric power from the lithium ion secondary battery system and converts the electric power into a driving force of the vehicle;
a drive section that drives according to the driving force; and
a vehicle control device.

20. A power storage system comprising:
a power storage device including the lithium ion secondary battery system according to claim 1;
a power consumption device to which electric power is supplied from the lithium ion secondary battery system;
a control device that controls the electric power supply from the lithium ion secondary battery system to the power consumption device; and
a power generation device that charges the lithium ion secondary battery system.

21. An electric tool comprising:
the lithium ion secondary battery system according to claim 1; and
a movable section to which electric power is supplied from the lithium ion secondary battery system.

22. An electronic device comprising the lithium ion secondary battery system according to claim 1,
wherein the electronic device receives a supply of electric power from the lithium ion secondary battery system.

* * * * *